(12) United States Patent
Quan et al.

(10) Patent No.: US 9,098,926 B2
(45) Date of Patent: Aug. 4, 2015

(54) GENERATING THREE-DIMENSIONAL FAÇADE MODELS FROM IMAGES

(75) Inventors: Long Quan, Hong Kong (CN); Jianxiong Xiao, Hong Kong (CN); Tian Fang, Hong Kong (CN); Peng Zhao, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 969 days.

(21) Appl. No.: 12/692,155

(22) Filed: Jan. 22, 2010

(65) Prior Publication Data

US 2010/0201682 A1    Aug. 12, 2010

Related U.S. Application Data

(60) Provisional application No. 61/202,230, filed on Feb. 6, 2009.

(51) Int. Cl.
    *G06T 17/00*      (2006.01)
    *G06K 9/00*      (2006.01)
    *G06T 15/04*      (2011.01)

(52) U.S. Cl.
    CPC ............ *G06T 17/00* (2013.01); *G06K 9/00704* (2013.01); *G06T 15/04* (2013.01)

(58) Field of Classification Search
    CPC .................................................. G06K 9/4604
    See application file for complete search history.

(56) References Cited

U.S. PATENT DOCUMENTS

| | | |
|---|---|---|
| 5,495,576 A | 2/1996 | Ritchey |
| 6,124,864 A | 9/2000 | Madden et al. |
| 6,798,407 B1 | 9/2004 | Benman |
| 6,903,738 B2 | 6/2005 | Pfister et al. |
| 6,983,082 B2 | 1/2006 | Duiker |
| 7,174,039 B2 | 2/2007 | Koo et al. |
| 7,199,793 B2 | 4/2007 | Oh et al. |
| 2004/0125877 A1* | 7/2004 | Chang et al. ............. 375/240.28 |
| 2005/0063582 A1 | 3/2005 | Park et al. |
| 2005/0128212 A1 | 6/2005 | Edecker et al. |
| 2006/0152507 A1 | 7/2006 | Lee et al. |
| 2006/0227132 A1 | 10/2006 | Jang et al. |
| 2007/0132763 A1 | 6/2007 | Chu et al. |
| 2008/0010304 A1* | 1/2008 | Vempala et al. .............. 707/100 |

(Continued)

FOREIGN PATENT DOCUMENTS

EP      1566052      8/2005

OTHER PUBLICATIONS

Van Gool L., Zeng G., Van den Borre F., Müller P., "Towards mass-produced building models", International archives of photogrammetry, remote sensing and spatial information sciences, proceedings Photogrammetric image analysis—PIA07, vol. 36 part 3, pp. 209-220, Sep. 19-21, 2007, Munich, Germany.*

(Continued)

*Primary Examiner* — Zhengxi Liu
(74) *Attorney, Agent, or Firm* — Amin, Turocy & Watson, LLP

(57) ABSTRACT

The subject disclosure relates to generating three-dimensional façade models from images. In one aspect, a systematic decomposition schema is disclosed for a façade structured into a Direct Acyclic Graph and implemented as a top-down recursive subdivision and bottom-up merging. In a further aspect, optimization of façade depth operating in a façade surface and in the super-pixel level of a whole subdivision region is described.

15 Claims, 24 Drawing Sheets

(56) References Cited

U.S. PATENT DOCUMENTS

| | | |
|---|---|---|
| 2008/0310733 A1 | 12/2008 | Adabala |
| 2009/0141020 A1 | 6/2009 | Freund et al. |
| 2010/0214291 A1* | 8/2010 | Muller et al. ............. 345/420 |

OTHER PUBLICATIONS

Vogiatzis, G and Seitz, GS and Torr, PHS and Cipolla, R (2004) Reconstructing relief surfaces. In: The 15th British Machine Vision Conference (BMVC'04), 2004, Kingston-upon-Thames, UK pp. 117-126.*

A. Agarwala et al., "Photographing Long Scenes with Multiviewpoint Panoramas," to be published in ACM Trans. Graphics, vol. 25, No. 3, 2006.*

P. Musialski, P. Wonka, D. G. Aliaga, M. Wimmer, L. V. Gool, and W. Purgathofer. A survey of urban reconstruction. In EUROGRAPHICS 2012 State of the Art Reports, 2012.*

Bohm, J., 2004. Multi-image fusion for occlusion-free facade texturing. International Archives of the Photogrammetry, Remote Sensing and Spatial Information Sciences, 35(5): 867-872.*

Dick, A. R., Torr, P. H. S., and Cipolla, R. 2004. Modelling and interpretation of architecture from several images. International Journal of Computer Vision 60, 2, 111-134.*

Szeliski, R. (2006). "Image alignment and stitching: a tutorial." Foundations and Trends in Computer Graphics and Computer Vision, 2(1).*

"Laboratory 6 of Computer Vision course CITS4240 offered at the University of Western Australia" http://undergraduate.csse.uwa.edu.au/units/CITS4240/Labs/Lab6/lab6.html. Archived on Aug. 30, 2007. Retrieved on Apr. 15, 2014 from <https://web.archive.org/web/20070830011855/http://undergraduate.csse.uwa.edu.au/units/CITS4240/Labs/Lab6/lab6.html>.*

Agarwala, A., Agrawala, M., Cohen, M., Salesin, D., and Szeliski, R. 2006. Photographing long scenes with multi-viewpoint panoramas. ACM Transactions on Graphics( SIGGRAPH) 25,3,853-861.

Berg, A. C., Grabler, F., and Malik, J. 2007. Parsing images of architectural scenes. In Proceedings of IEEE International Conference on Computer Vision, 1-8.

Boykov, Y., Veksler, O., and Zabih, R. 2001. Fast ap541 proximate energy minimization via graph cuts. IEEE Trans. on Pattern Analysis and Machine Intelligence 23, 11, 1222-1239.

Canny, J. F. 1986. A computational approach to edge detection. IEEE Trans. on Pattern Analysis and Machine Intelligence 8,679-714.

Cornelis, N., Leibe, B., Cornelis, K., and Gool, L. V. 2008. 3D urban scene modeling integrating recognition and re construction. International Journal of Computer Vision 78, 2 (July), 121-141.

Criminisi, A., Perez, P., and Toyama, K. 2003. Object removal by exemplar-based inpainting. In Proceedings of IEEE Computer Vision and Pattern Recognition, vol. 2, 721-728.

Curless, B., and Levoy, M. 1996. A volumetric method for building complex models from range images. In Proc. of the 23rd annual conference on Computer graphics and interactive techniques, ACM, 303-312.

Debevec, P., Taylor, C., and Malik, J. 1996. Modeling and rendering architecture from photographs: a hybrid geometry and image-based approach. In Proceedings of ACM SIGGRAPH, 11-20.

Dick, A., Torr, P., and Cipolla, R. 2004. Modelling and interpretation of architecture from several images. International Journal of Computer Vision 2, 111-134.

Duda, R. O., and Hart, P. E. 1972. Use of the hough transformation to detect lines and curves in pictures. Communications of the ACM 15, 1, 11-15.

Felzenszwalb, R, and Huttenlocher, D. 2004. Effi563 cient Graph-Based image segmentation. International Journal of Computer Vision 59, 2, 167-181.

Fruh, C., and Zakhor, A. 2003. Constructing 3d city models by merging ground-based and airborne views. In Proceedings of IEEE Computer Vision and Pattern Recognition, vol. 2, 562-569.

Furukawa, Y., and Ponce, J. 2007. Accurate, dense, and robust multi-view stereopsis. In Proceedings of IEEE Conference Computer Vision and Pattern Recognition, 1-8.

Geman, S., and Geman, D. 1984. Stochastic relaxation, gibbs distributions, and the bayesian restoration of images. IEEE Transactions on Pattern Analysis and Machine Intelligence 6, 6, 721-741.

Goesele, M., Snavely, N., Curless, B., Seitz, S. M., and Hoppe, H. 2007. Multi-view stereo for community photo collections. In Proceeding of IEEE International Conference in Computer Vision, 1-8.

Kullback, S., and Leibler, R. A. 1951. On information and sufficiency. Annals of Mathematical Statistics 22, 79-86.

Lhuillier, M., and Quan, L. 2005. A quasi-dense approach to surface reconstruction from uncalibrated images. IEEE Transactions on Pattern Analysis and Machine Intelligence 27, 3, 418-433.

Li, Y. Sun, J., Tang, C.-K., and Shum, H.-Y. 2004. Lazy snapping. ACM Transactions on Graphics 23, 303-308.

Muller, P., Wonka, P., Haegler, S., Ulmer, A., and Gool, L. V. 2006. Procedural modeling of buildings. ACM Transactions on Graphics 3, 614-623.

Muller, P., Zeng, G., Wonka, P., and Gool, L. V. 2007. Image-based procedural modeling of facades. In ACM SIG GRAPH 2007 papers, ACM, San Diego, California, 26, 3, 85.

Oh, B. M., Chen, M., Dorsey, J., and Durand, F. 2001. Image-based modeling and photo editing. In Proc. of the 28th annual conference on Computer graphics and interactive tech niques, ACM, 433-442.

Oliva, A., and Torralba, A. 2006. Building the gist of a scene: the role of global image features in recognition. Progress in Brain Research 155, 23-36. PMID: 17027377.

Pearl, J. 1982. Reverend bayes on inference engines: A dis tributed hierarchical approach. In Proc. of AAAI National Con ference on Al, 133-136.

Pollefeys, M., Nistr, D., Frahm, J., Akbarzadeh, A., Mordohai, P., Clipp, B., Engels, C., Gallup, D., Kim, S., Merrell, P., Salmi, C., Sinha, S., Talton, B., Wang, L., Yang, Q., Stewnius, H., Yang, R., Welch, G., and Towles, H. 2008. Detailed Real-Time urban 3D reconstruction from video. International Journal of Computer Vision 78, 2 (July), 143-167.

Scharstein, D., and Szeliski, R. 2002. A taxonomy and evaluation of dense two-frame stereo correspondence algorithms. International Journal of Computer Vision 47, 1/2/3, 7-42.

Schindler, G., Krishnamurthy, P., and Dellaert, F. 2006. Line-Based structure from motion for urban environments. In 3D Data Processing, Visualization, and Transmission, Third International Symposium on, 846-853.

Shotton, J., Winn, J., Rother, C., and Criminisi, A. 2009. TextonBoost for image understanding: Multi-Class object recog nition and segmentation by jointly modeling texture, layout, and context. International Journal of Computer Vision 81, 1, 2-23.

Sinha, S. N., Steedly, D., Szeliski, R., Agrawala, M., and Pollefeys, M. 2008. Interactive 3D architectural modeling from unordered photo collections. ACM Trans. Graph. 27, 5, 1-10.

Snavely, N., Seitz, S. M., and Szeliski, R. 2006. Photo tourism: Exploring photo collections in 3d. ACM Transactions on Graphics 3, 835-846. Sun, J., Yuan, L., Jia, J., and Shum, H.-Y. 2005. Image completion with structure propagation. ACM Transactions on Graphics 24, 861-868.

Torralba, A., Murphy, K., and Freeman, W. 2007. Shar ing visual features for multiclass and multiview object detection. IEEE Trans. on Pattern Analysis and Machine Intelligence 29, 5, 854-869.

Van Den Hengel, A., Dick, K, Thormahlen, T., Ward, B., and Torr, P. H. S. 2007. Videotrace: rapid interactive scene modelling from video. ACM Transactions on Graphics 3, 86.

Vogiatzis, G., Torr, P. H. S., Seitz, S. M., and Cipolla, R. 2008. Reconstructing relief surfaces. Image and Vision Computing 26, 3, 397-404.

Weiss, Y., and Freeman, W. T. 2001. On the optimality of solutions of the max-product belief propagation algorithm in arbitrary graphs. IEEE Transactions on Information Theory 47, 2, 723-735.

Werner, T., and Zisserman, A. 2002. Model selection for automated architectural reconstruction from multiple views. In Proc. of the British Machine Vision Conference, 5362.

(56) References Cited

OTHER PUBLICATIONS

Werner, T., and Zisserman, A. 2002. New techniques for automated architectural reconstruction from photographs. In Proceedings of the European Conference on Computer Vision, vol. 2, 541-555.

Winn, J., Criminisi, A., and Minka, T. 2005. Object categorization by learned universal visual dictionary. In Computer Vision, 2005. ICCV 2005. Tenth IEEE International Conference on, vol. 2, 1800-1807 vol. 2.

Wonka, P., Wimmer, M., Sillion, F., and Ribarsky, W. 2003. Instant architecture. ACM Transactions on Graphics 4, 669-677.

Xiao, J., Fang, T., Tan, P., Zhao, P., Ofek, E., and Quan, L. 2008. Image-based façade modeling. ACM Trans. Graph. 27, 5, 1-10.

Zebedin, L., Klaus, A., Gruber-Geymayer, B., and Karner, K. 2006. Towards 3D map generation from digital aerial images. ISPRS Journal of Photogrammetry and Remote Sensing 60, 6 (Sept.), 413-427.

Zebedin, Lukas, Joachim, B., Konrad, K., and Horst, B. 2008. Fusion of feature- and area-based information for urban buildings modeling from aerial imagery. In Proceedings of the European Conference on Computer Vision.

Hartley, R. I., and Zisserman, A. 2004. Multiple View Geometry in Computer Vision, second ed. Cambridge University Press, ISBN: 0521540518, 310-324.

\* cited by examiner

GENERATING THREE-DIMENSIONAL FAÇADE MODELS FROM IMAGES

CROSS REFERENCE TO RELATED APPLICATIONS

This application claims priority to U.S. Provisional Patent Application Ser. No. 61/202,230, filed on Feb. 6, 2009, and entitled METHOD FOR GENERATING 3D FA $\overrightarrow{A \cap B}$ ADE MODELS FROM IMAGES, the entirety of which is hereby incorporated by reference.

TECHNICAL FIELD

The subject disclosure relates to façade modeling, and more particularly to generating three-dimensional façade models from images.

BACKGROUND

Driven by markets for games, movies, map services, robotics, navigation, photogrammetry, etc., a strong demand has developed for photo-realistic modeling of structures such as buildings, cities, landscapes, etc. However, conventional modeling of such structures focused on large-scale aerial photography-based city modeling. As a result, when these models are zoomed in to ground level, the visual results that viewers experience can be disappointing, with blurry models and vague or few details. Moreover, to provide a rewarding user experience, many potential applications demand photo-realistic street-level representation of such structures where most of our daily activities take place. In term of spatial constraints, the coverage of ground-level images is typically close-range. In addition, an increasing amount of data (e.g., movies, pictures, geospatial data, etc.) can be captured and processed in attempts to create such photo-realistic models. As a result, street-side modeling, for example, becomes much more technically challenging.

For instance, conventional approaches can range from pure synthetic methods such as artificial synthesis of buildings based on grammar rules, 3D (three-dimensional) scanning of street façades, to image-based approaches. Some examples, include requiring manual assignment of depth to the constructed façade as a result of using limited image data (e.g., one image-based approaches). In other examples, information from reconstructed 3D points can be used to automatically infer the critical depth of each primitive. However, some implementations require tedious 3D scanning, while others suffer from scaling difficulties in large scale modeling of structures such as buildings due to the use of a small set of images.

Conventional approaches to façade, building, and architectural modeling can be classified as rule-based, image-based and vision-based modeling approaches. For example, in rule-based methods, the procedural modeling of buildings are accomplished using a set of expert-specified rules. In general, procedural modeling can be limited in the realism of resulting models and their variations due to the required rule set and the potential inflexibility of the rule set. Thus, defining the required rules to produce photo-realistic models of existing structures such as buildings can be complex.

In image-based example(s), conventional approaches use images as guide to generate models of architectures interactively. However, even more sophisticated image-based methods can require manual selection of features as well as require tedious indication of the correspondence in different image views. As a result, conventional image-based examples can suffer from scaling problems. In other single image-based examples using manual depth assignment (e.g., such as assigning depth based on a painting metaphor or sketching approach), a limited domain of regular façades can be used to highlight the importance of features, such as windows in an architectural setting to create a building.

While some conventional examples can provide acceptable models in the context of regular buildings with simple repetitive façades, irregularities in building characteristics (e.g., such as in a street-side façade) require more sophisticated techniques. Other examples, while having general applicability in the context of irregularities, can be difficult to scale up for large-scale reconstruction due to intense manual interaction. Still other examples can require tedious manual assignment of model parameterizations and point correspondences.

On the other hand, vision-based examples can automatically reconstruct urban scenes from images. Typical examples can result in meshes on a dense stereo reconstruction. However, proper modeling with man-made structural constraints from reconstructed point clouds and stereo data has not yet been addressed. For example, while some examples use line segments to reconstruct buildings, other examples can construct 3D architectural models from short image sequences based on a model-based Bayesian approach. However, the latter examples still heavily rely on many specific architectural rules and model parameters.

Other examples of urban scene modeling have been based on aerial images. As discussed, the results of such approaches, while providing acceptable results from a top view perspective, leave much to be desired from a ground level perspective. Further examples have used a combination of aerial imagery, ground color and Light Detection and Ranging (LIDAR) scans to construct models of façades. However, like stereo methods, the approaches can suffer from the lack of representation for the styles in man-made architectures. Still other examples can create panoramas of roughly planar scenes, but the panoramas are created without producing corresponding 3D models.

It is thus desired to provide enhanced systems, structures and methodologies for producing three-dimensional façade models from images that improve upon these and other deficiencies of conventional modeling technologies. The above-described deficiencies of typical modeling technologies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the term "façade" is intended to refer to a prominent visual representation of one or more objects. For example, the term "façade" is typically used to refer to a face of an object, e.g., such as a building, and typically refers to a front face or a surface facing a viewer. However, as used herein, the term "façade" can refer to any number of any type of objects having a prominent visual representation, for example, such as buildings, cities, cityscapes, landscapes, other objects of interest, etc. As further used herein, the terms "data representation of a façade" and "data representing a façade" can refer to information useful for describing physical, visual, or other characteristics of one or more objects that can be represented by a façade.

Various embodiments for generating three-dimensional façade models from images are provided. In one aspect, a systematic decomposition schema is disclosed for a façade structured into a Direct Acyclic Graph (DAG) and implemented as a top-down recursive subdivision and bottom-up merging. In a further aspect, optimization of façade depth operating in a façade surface and in the super-pixel level of a whole subdivision region is described.

Accordingly, in exemplary methods that facilitate image-based façade modeling, the method can comprise decomposing a façade based on a composite texture input, by recursively subdividing the façade into a set of subdivided patches. In addition, the methods can include augmenting the façade with depth information such as an optimized an optimized depth for each subdivided patch.

As another example, methods for façade image decomposition can comprise extracting hidden structure from a reference texture image and partitioning the reference texture image based on the hidden structure. The methods can further include recursively subdividing the reference texture image into a set of subdivided regions based in part on the partitioned reference texture image.

In other embodiments described in more detail below, image-based façade modeling systems and methods of façade augmentation to assign depth information to a façade in a façade modeling system are provided. These and other embodiments are described in more detail below.

BRIEF DESCRIPTION OF THE DRAWINGS

Various non-limiting embodiments are further described with reference to the accompanying drawings in which.

DETAILED DESCRIPTION

Overview

While a brief overview is provided, certain aspects of the disclosed subject matter are described or depicted herein for the purposes of illustration and not limitation. Thus, variations of the disclosed embodiments as suggested by the disclosed apparatuses, systems and methodologies are intended to be encompassed within the scope of the subject matter disclosed herein. For example, the various embodiments of the apparatuses, systems, and methodologies of the disclosed subject matter are described in the context of a developable surface in terms of a flat rectangular plane. However, as further detailed below, other developable surface can be used, without departing from the subject matter described herein.

Figure 1:
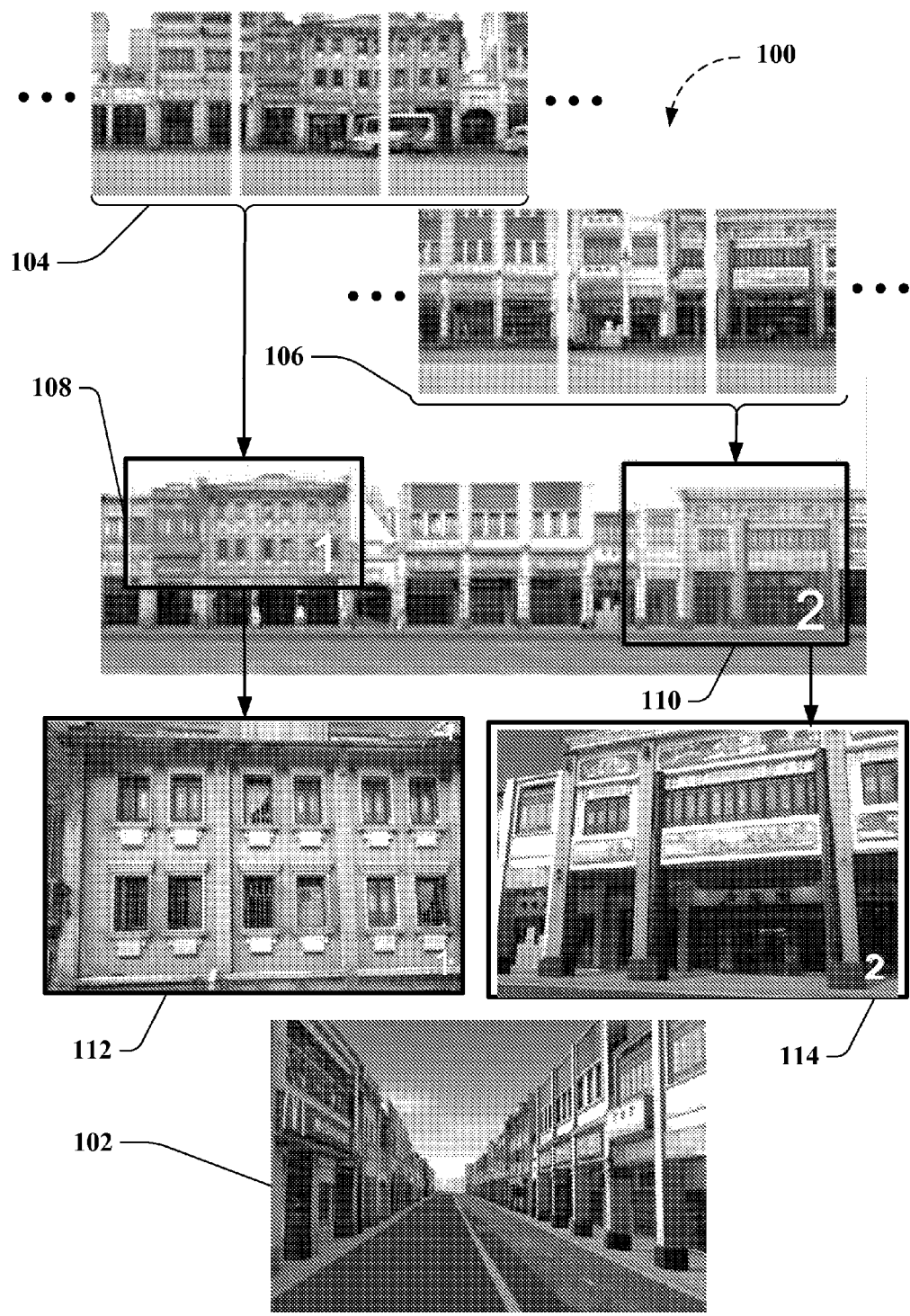
FIG. 1 depicts non-limiting façade modeling examples, for which implementations of the disclosed subject matter can applied.

FIG. 1 depicts non-limiting façade modeling examples, for which implementations of the disclosed subject matter can applied. For instance, according to various aspects, a façade model such as represented in 102 of two sides of a street can be accomplished. As an example, an exemplary implementation of the disclosed subject matter was applied to a series of 614 captured images to generate a 3D façade model: two subsets of the input images are depicted in FIG. 1 as series 104 and series 106. Models recovered from the series of captured images are rendered beneath the respective subsets of images 104 and 106. These façade models are depicted as the areas annotated as 108 and 110, with sections of the recovered model rendered below in panels 112 and 114 (also labeled panels 1 and 2), respectively.

As described in the background, conventional façade modeling approaches can suffer from scaling difficulties due to tedious 3D scanning, intensive manual manipulation of images and/or depth assignment, and can result in inflexible modeling techniques stemming from a limited expert-specified rule set. As a result, while some conventional techniques can be used on regular buildings having simple repetitive façades, such conventional techniques face significant technical challenges when applied to street-view data and façade modeling examples such as depicted in FIG. 1.

To address these and other deficiencies, the disclosed subject matter provides semi-automatic image-based façade modeling. For example, as further describe below, various non-limiting embodiments can employ a set of images captured along a street to generate three-dimensional façade models from images. According to one aspect, structure from motion can be used to automatically recover camera positions and point clouds for use in the disclosed modeling techniques. According to a further aspect, a building façade can be considered as a developable surface (e.g., such as a flat rectangular plane or other developable surface) with an associated texture image composited from the multiple visible images.

A building façade can be decomposed and structured into a DAG of elementary patches (e.g., such as rectilinear elementary patches), according to various embodiments. In various aspects, a systematic and automatic decomposition scheme of façades allows for both analysis and reconstruction of the façade.

Advantageously, decomposition achieved through the disclosed recursive subdivision preserves the architectural structure by obtaining a DAG representation of the façade by both top-down subdivision and bottom-up merging with local bilateral symmetries to handle repetitive patterns. The DAG representation naturally encodes the architectural shape prior of a façade and enables the depth of the façade to be optimally computed on the surface and at the level of the subdivided regions. Thus, according to further aspects each subdivided patch of the façade can be augmented with a depth optimized using the 3D points cloud.

As a further advantage, a simple and intuitive interface can assist in providing feedback on façade partition, among other aspects of façade modeling. Thus, in a further aspect, various embodiments can utilize such feedback in the two-dimensional (2D) image space during decomposition and/or augmentation, etc. As further described below, a large number of exemplary non-limiting façades are generated from a variety of street-side images to demonstrate the flexibility and efficiency with which façade models can be produced according to various aspects described herein. The exemplary results demonstrate the high visual quality from multiple ground-level street-view images achievable according to aspects of the disclosed subject matter.

Figure 2:
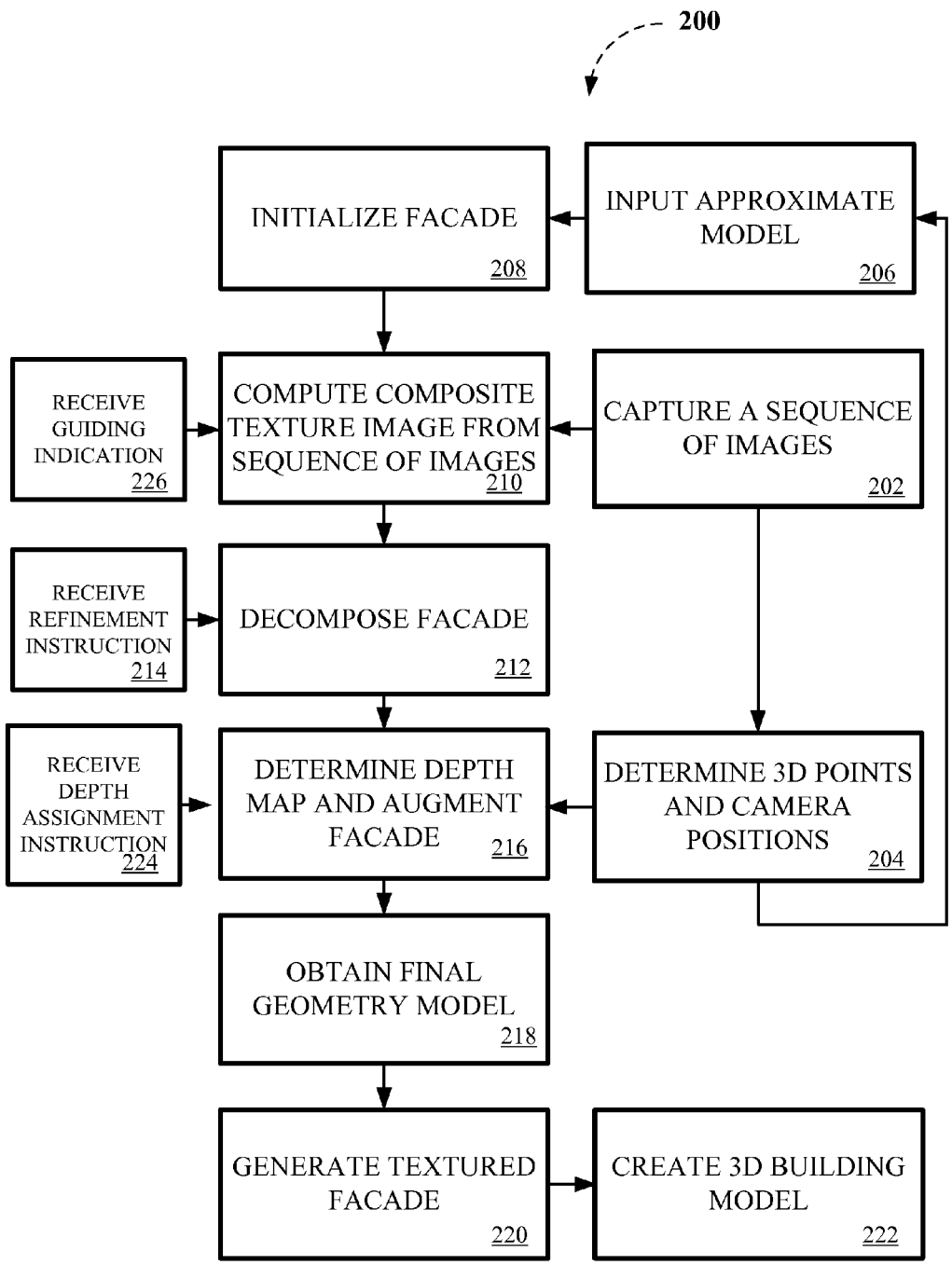
FIGS. 2 and 3 depict various aspects of exemplary non-limiting methodologies for image-based façade modeling.
Figure 3:
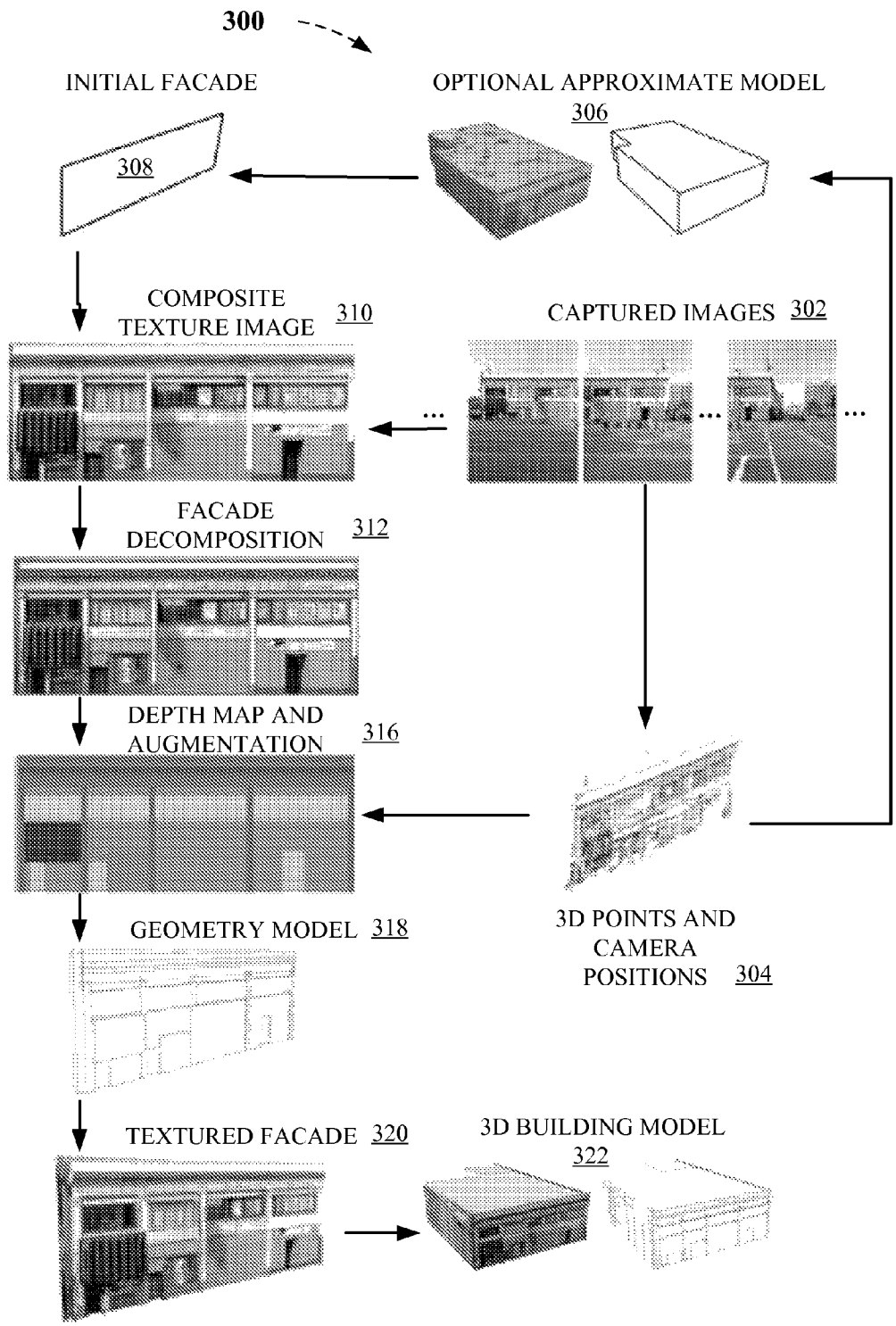

FIGS. 2 and 3 depict various aspects of exemplary non-limiting methodologies 200 and 300 for image-based façade modeling. For example, at 202 a sequence of overlapping images can be captured. At 204, structure from motion can be automatically computed to obtain a set of semi-dense 3D points and all, or substantially all, camera positions, according to various embodiments. According to an aspect, the reconstruction can be registered with a predetermined approximate model 206 of the model subject (e.g., one or more sub-structures, structures, buildings etc. to be modeled). For instance, an approximate model can be recovered from images (either captured or otherwise available) by comparison to location data (e.g., using global positioning system (GPS) data, or other location or navigation data, etc.) or manually if geo-registration information is not available.

Methodologies 200 and 300 for image-based façade modeling can further include initializing a façade (e.g., such as a building façade) as a developable surface at 208 such as flat rectangular plane. Alternatively, as further described with reference to FIG. 5, a developable surface other than a flat rectangular plane can be obtained automatically from a geo-registered approximate building model. As a further alternative, a line segment or a curve can be marked up on projected 3D points onto the ground plane. Accordingly, a texture image of the flat façade can be computed 210 from the multiple visible images of the façade. Various embodiments of the disclosed subject matter can advantageously detect occluded objects in the texture composition thanks to multiple images and the parallax of different camera positions.

In addition, methodologies 200 and 300 for image-based façade modeling can include systematically decomposing a façade into a partition of rectangular patches based on horizontal and vertical lines detected in the composite texture image at 212. For instance, as will be described in further detail, a decomposition can be carried out top-down by a recursive subdivision and followed by a bottom-up merging, with detection of the architectural bilateral symmetry and repetitive patterns. As a result, a partition can be structured into a DAG of rectilinear elementary patches. In various embodiments, this representation strongly embeds the architectural prior of the façades and buildings into different stages of modeling. As a further advantage according to a further aspect, the partition can be edited (e.g., partition edit information can be input 214) through an interface (e.g., adding and removing horizontal and vertical lines). For example, as described in further detail regarding FIGS. 7 and 12 refinement instruction can be received At 216, as further described below, the façade can be augmented with depth information by augmenting subdivided patches of the developable surface (e.g., a flat façade) with depth information obtained from the maximum a posteriori (MAP) estimation of the Markov Random Field (MRF) with the data cost defined by the 3D points from the structure from motion. Advantageously, this optimization for façade depth operates in the façade surface and in the super-pixel level of a whole subdivision region, as will be further described in detail.

Furthermore, methodologies 200 and 300 for image-based façade modeling can include steps for completion of the façade. For example, at 218 a final geometry model can be obtained from the augmented façade at 216. Accordingly, the final geometry model at 218 can be automatically retextured from all or substantially all relevant input images at 220 to generate a textured façade. At 222, the textured façade can be combined with building model information (e.g., final geometry model, etc.) to create a 3D building model.

For example, FIG. 3 illustrates a sequence of overlapping images 302 that have been captured, in an exemplary non-limiting implementation. At 304, a set of semi-dense 3D points and all, or substantially all, camera positions, have been automatically obtained using structure from motion techniques. In this particular non-limiting embodiment, the reconstruction can be registered with an optional approximate model 306 of the model subject (e.g., the building to be modeled). At 308, the façade is initialized using a flat rectangular plane. Accordingly, a composite texture image of the flat façade can be computed 310 from the multiple visible images of the façade, either automatically or semi-automatically by receiving guiding indications 614 at 226 as described below regarding FIG. 6.

The façade is systematically decomposed at 312 into a partition of rectangular patches based on horizontal and vertical lines detected in the composite texture image resulting in a DAG of rectilinear elementary patches. As described in reference to FIG. 2, the partition can be edited (e.g., adding and removing horizontal and vertical lines). At 316, the façade is augmented with depth information by augmenting subdivided patches of the flat façade with depth information obtained from the MAP estimation of the MRF with the data cost defined by the 3D points from the structure from motion. The façade can be completed by texturing, at 320, the geometry model 318 with texture information from all or substantially all relevant input images to generate a textured façade. Accordingly, the textured façade can be combined with building model information (e.g., final geometry model, etc.) to create a 3D building model 322.

Figure 4:
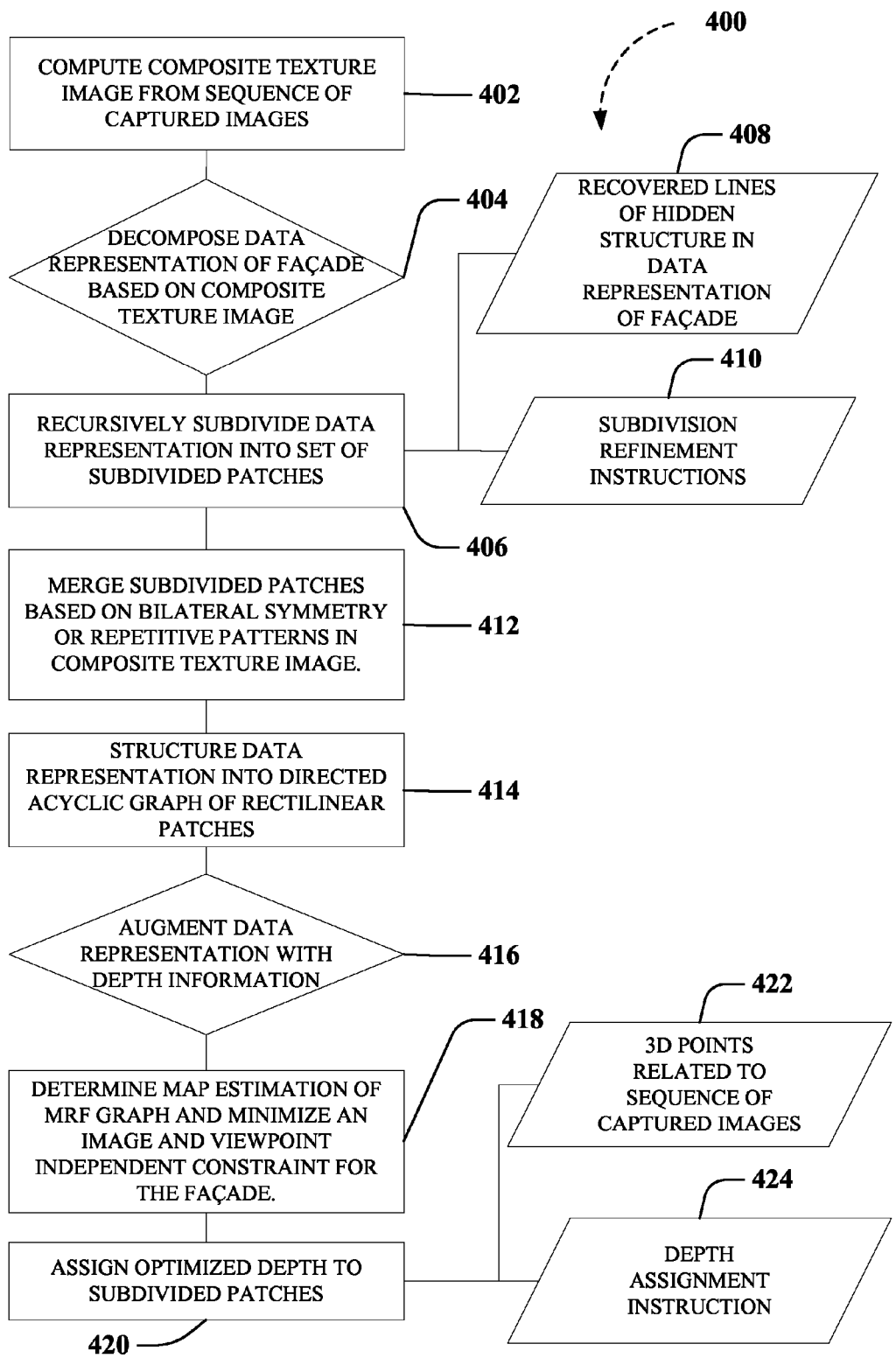
FIG. 4 depicts a flowchart demonstrating various aspects of exemplary non-limiting methodologies for image-based façade modeling.

Thus, according to various embodiments, methodologies that facilitate image-based façade modeling are provided. For instance, FIG. 4 depicts various aspects of exemplary non-limiting methodologies 400 for image-based façade modeling. For example, methodologies 400 can comprise computing a composite texture from a sequence of captured images at 402. If decomposing a data representation of a façade based on the composite texture image is desired at 404, the data representation of the façade can be recursively subdivided into a set of subdivided patches at 406.

Figure 7:
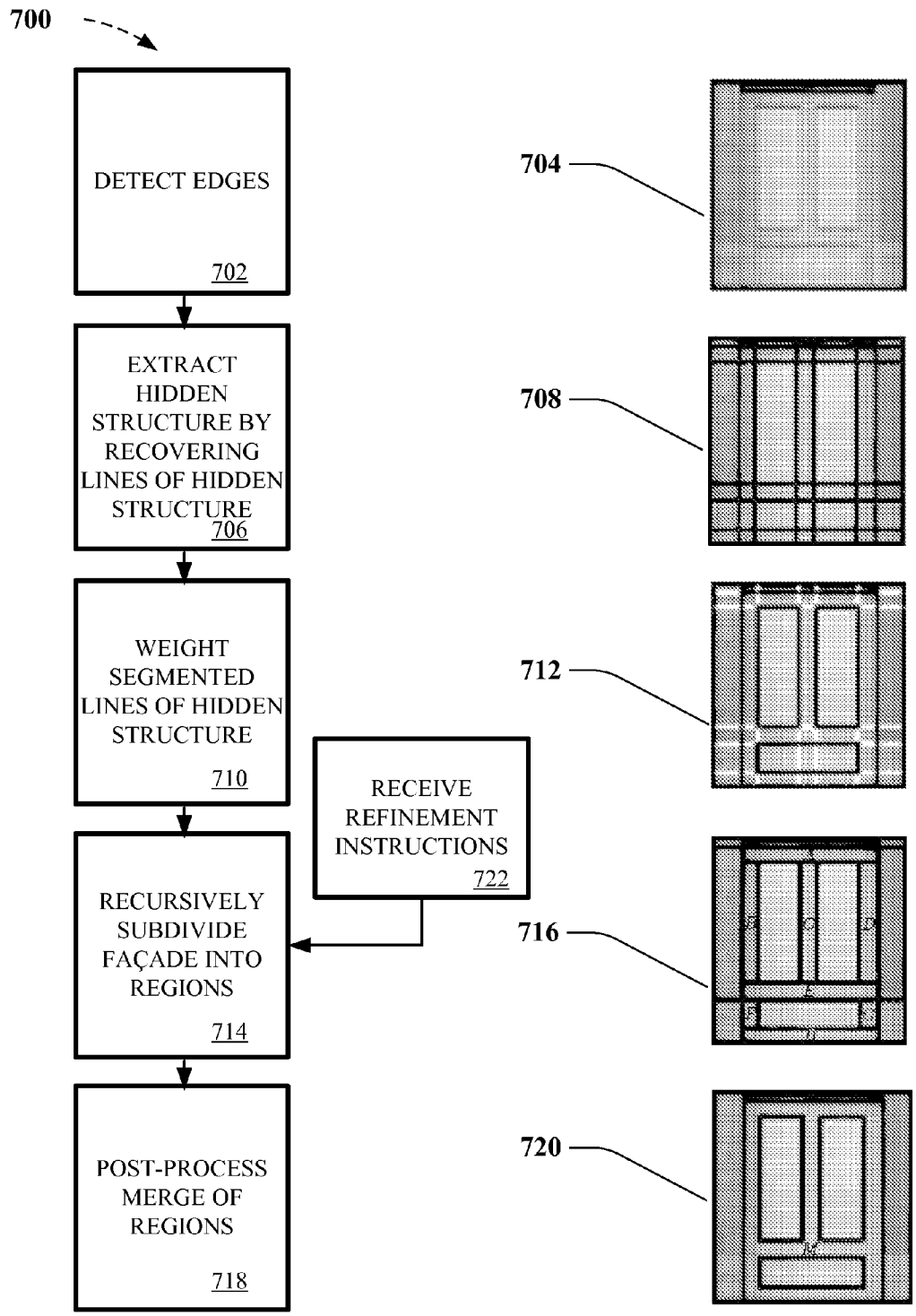
FIGS. 7-8 depict an exemplary non-limiting block diagram of methodologies for decomposing a façade and illustrative examples of façade decomposition.

For example, methodologies 400 can include subdividing the data representation of the façade into the set of subdivided patches based on recovering lines of hidden structure 408 in the data representation of the façade as described below regarding FIG. 7. As a further example, methodologies 400 can also include subdividing the data representation of the façade into the set of subdivided patches based on receiving refinement instructions 410 as further described below regarding FIG. 7.

According to an aspect, various embodiments of methodologies 400, decomposing a data representation can include merging a subset of the subdivided patches at 412 based on bilateral symmetry (e.g., architectural bilateral symmetry, etc.) or repetitive patterns in the composite texture image. In further aspects, at 414, decomposing a data representation can include structuring the data representation of the façade into a directed acyclic graph of patches, such as rectilinear patches, for example, as described below. If augmenting the data representation with depth information is desired at 416, various embodiments of methodologies 400 can include augmenting the data representation of the façade with depth information, for example, by assigning an optimized depth to at least one of the subdivided patches.

For instance, according to aspects of methodologies 400, embodiments of the disclosed subject matter can include determining a maximum a posteriori estimation of a Markov Random Field graph and minimizing an image and viewpoint independent constraint for the façade at 418. According to further aspects of methodologies 400, embodiments of the disclosed subject matter can include assigning the optimized depth to subdivided patches 420 based on three dimensional points related to images used to create the composite texture at 422 and/or a depth assignment instruction related to a subset of the subdivided patches at 424.

While a brief overview has been provided, certain aspects of the disclosed subject matter were described or depicted herein for the purposes of illustration and not limitation, whereas further embodiments are described in more detail below.

Image Collection

According to various embodiments, images can be captured using a camera facing orthogonal to the desired façade to be modeled (e.g., a building façade) and moving laterally along a predetermined course (e.g., along a street passing the building façade). In a preferred embodiment, a camera can be held level and straight (e.g., approximately orthogonal to the façade and the direction of travel) with images captured such that the neighboring two views (e.g., two consecutive images in a sequence) have sufficient overlap of the building façade to make building feature correspondences computable. It can be understood that density and accuracy of the reconstructed points vary, depending on distance between the camera and the objects (e.g., a building or other façade, any occluding objects, etc.), and the distance between the neighboring viewing positions. Furthermore, it is understood that similar sequences of pictures can be obtained, rather than taking a series of images along a direction of travel, by using an array of cameras positioned along the hypothetical direction of travel.

Point correspondences and structure from motion for a given sequence of images can be computed, according to various techniques such as, for example, standard computer vision techniques. In a preferred embodiment, for a given sequence of images, camera poses and a semi-dense set of 3D point clouds in space can be computed via such techniques, advantageously, because computer vision techniques have proven to be robust and capable of providing sufficient point clouds for object modeling purposes.

Façade Initialization

Figure 5:
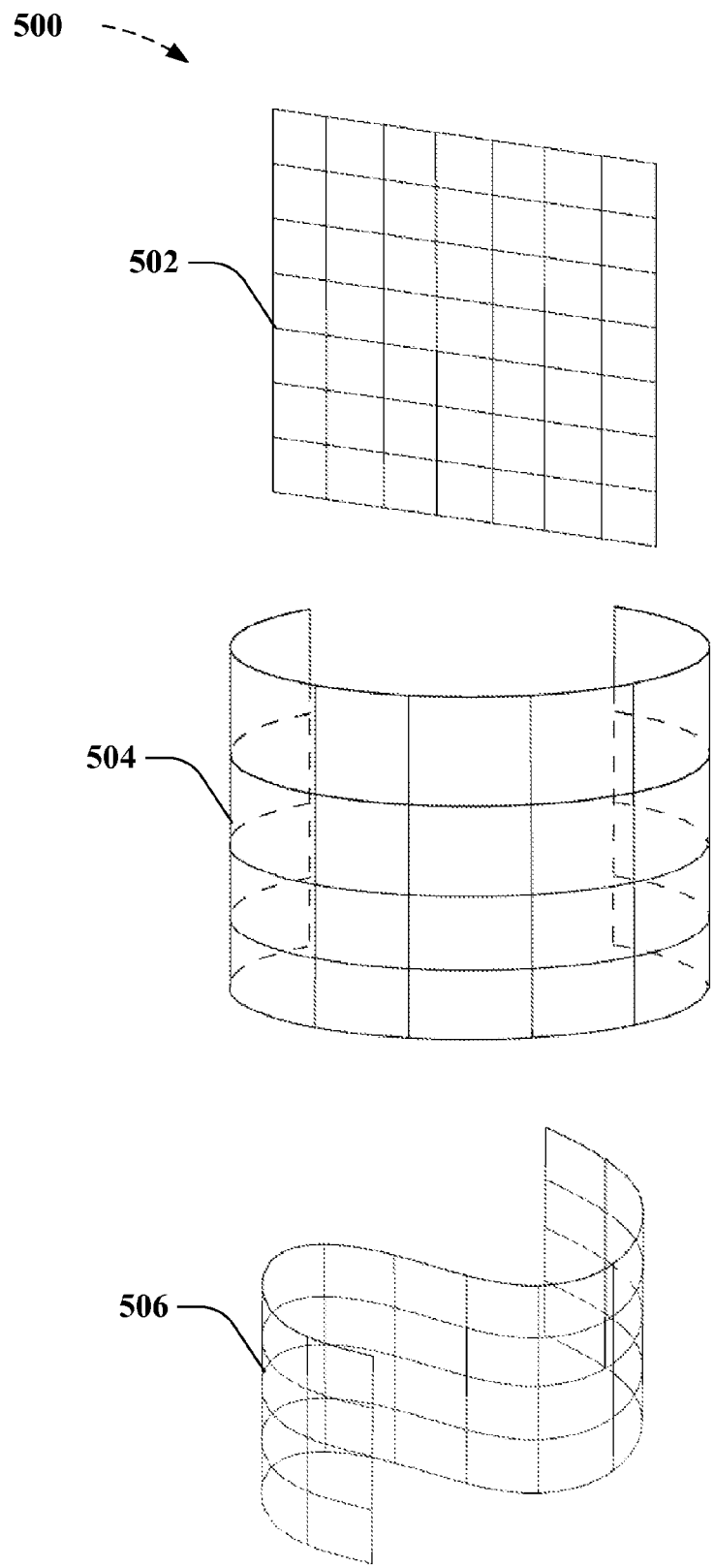
FIG. 5 depicts various developable surfaces for which implementations of the disclosed subject matter can be applied.

FIG. 5 depicts various developable surfaces for which exemplary implementations of the disclosed subject matter can be applied. For example, as described above, a façade can be initialized from a flat rectangular planar surface 502. For the purposes of illustration of the exemplary embodiments disclosed herein (e.g., building façades, city street façades) it is simpler to assume that the façade has a dominant planar structure. Accordingly, in such non-limiting illustrations, a façade can be initialized as a flat plane with a depth field on the plane, while acknowledging and assuming that depth variations within a simple façade are moderate. However, note that a real façade (e.g., building façade, city street façade, etc.) can have complex geometry and topology. According to various aspects of the disclosed subject matter, façades more complex than the simple case can be broken down into multiple simple façades.

In other words, according to various embodiments, a building can be treated as a collection of façades, and a street as a collection of buildings. Although the dominant plane of the majority of such façades can be flat, it can also exist as curved surface. For example, consider the developable surfaces 504 (e.g., cylindrical, or tending towards the shape of a cylinder) and the more complex developable surface 506. Advantageously, such complex shaped developable surface can be used in façade initialization, according to various aspects.

Thus, in various embodiments, façade initialization can include dominant surface structures of any developable surface that can be swept by a straight line as illustrated in FIG. 5. However, for ease of illustration and not limitation, and without loss of generality, a flat façade is described herein, unless otherwise noted (e.g., some cylindrical façade examples are described below). Accordingly, for any developable surface, it should be understood that similar approaches can be employed for generating façade models as for flat façades, with trivial surface parameterizations used in appropriate steps.

As described above regarding FIGS. 2 and 3, a reference system of the 3D reconstruction can be automatically geo-registered (e.g., using GPS data of the camera, if available), or using an interactive technique. For example, in various embodiments, façade modeling can begin with an existing approximate model 306 (e.g., for façade initialization at 208) of buildings reconstructed from areal images, for example, such as publicly available images from Google™ Earth and Microsoft® Virtual Earth®. In alternative embodiments, where no such approximate model exists, a manual process can be used to segment the façades, for example, based on the projections of 3D points to the ground floor. For instance, in an aspect, a line segment or a curve can be "drawn" on the ground to mark up a façade plane as a flat rectangle or a developable surface portion. Thus, according to various embodiments, a plane or surface position can be automatically fitted to 3D points or manually adjusted if necessary.

Composite Texture Image

Referring again to FIGS. 2 and 3, typically, a façade is too big to be entirely observable in one input image (e.g., captured images 302). To that end, a texture image can be composited 210 (e.g., computing a composite texture image 310) for the entire rectangle of the façade based at least in part on at least a subset of the input images. It can be understood that while such a process is similar in concept to a compositing a mosaic image from input images, computing a composite texture image is different from an image mosaic, as the images (e.g., captured images 302) have parallax (e.g., different or substantially different focal points), whereas a mosaic is composited from images having the same or substantially similar focal points. Advantageously, this aspect of the disclosed subject matter is helpful in removing undesired occluding objects (e.g., pedestrians, cars, trees, telegraph poles, trash cans, etc.) that lie in front of the target façade.

Furthermore, the façade plane position is known, or relatively known, compared with an unknown spatial position of an occluding object in stereo algorithms. As a result, according to various embodiments of the disclosed subject matter a photo consistency constraint can be efficiently employed for robust occluding object removal, which can advantageously result in a better texture image than with a pure mosaic. Accordingly, an exemplary non-limiting implementation of multi-view occlusion removal will be described to further understand the advantages and operation of the disclosed subject matter.

For example, in many multiple view stereo methods, photo consistency can be defined as follows. Consider a 3D point $X=(x, y, z, 1)'$ with color c. If it has a projection, $x_i=(u_i, v_i, 1)'=P_iX$ in the i-th camera $P_i$, under the Lambertian surface assumption, the projection $x_i$ should also have the same color, c. However, if the point is occluded by some other objects in this camera, the color of the projection is usually not the same as c. (Note that c is unknown.) Assuming that point X can be visible from multiple cameras, $I=\{P_i\}$, and occluded by some objects in the other cameras, $I'=\{P_j\}$, then the color, $c_i$, of the projections in I should be the same as c, while it may be different from the color, $c_j$, of projections in I'. Given a set of projection colors, $\{c_k\}$, the task of occlusion removal can be facilitated by identifying a set, O, of the occluded cameras. In most situations, it can be assumed that point X is visible from most of the cameras. Under this assumption, $\hat{c} \approx \text{median}_k \{c_k\}$. Given the estimated color of the 3D point $\hat{c}$, identifying the occluded set of cameras, O, according to their distances with $\hat{c}$ can be relatively straightforward.

However, in various embodiments, robustness of the occlusion detection can be improved by, instead using a of a single color as a determinant, image patches centered at the projections can be used, while patch similarity (e.g., normalized cross correlation (NCC)) can be used as a metric. As a non-limiting example, consider the details presented in Algorithm 1.

Algorithm 1 Photo Consistency Check For Occlusion Detection

---

Require: A set of N image patches $P=\{p_1, p_2, \ldots, p_N\}$ corresponding to the projections $\{x_i\}$ of the 3D point X.
Require: $\eta \in [0, 1]$ to indicate when two patches are similar.
1: for all $p_i \in P$ do
2:      $s_i \leftarrow 0$      ▷Accumulated similarity for $p_i$
3:      for all $p_j \in P$ do
4:          $s_{ij} \leftarrow NCC(p_i, p_j)$
5:          if $s_{ij} > \eta$ then $s_i \leftarrow s_i + s_{ij}$
6:          end if
7:      end for
8: end for
9: $\hat{n} \leftarrow \arg\max_i s_i$      ▷$\hat{n}$ is the patch with best support
10: $V \leftarrow \emptyset$      ▷V is the index set with visible projection
11: $O \leftarrow \emptyset$      ▷V is the index set with occluded projection
12: for all $p_i \in P$ do
13:      if $s_{i,\hat{n}} > \eta$ then $V \leftarrow V \cup \{i\}$
14:      else $O \leftarrow O \cup \{i\}$
15:      end if
16: end for
17: return V and O

---

Thus, according to various embodiments, using the assumption that the façade is almost planar, each pixel of the reference texture corresponds to a point that lies on the flat façade. As a result, it can be identified for each pixel whether it is occluded in a particular camera. Accordingly, for a given planar façade in space, all visible images can be sorted first according to the fronto-parallelism of the images with respect to the given façade. An image can be said to be more fronto-parallel if the projected surface of the façade in the image is larger. Thus, the reference image can be warped first from the most fronto-parallel image, then from the lesser ones according to the visibility of the point.

According to a further aspect, due to existence of occluding objects, some regions of the reference texture image may still be left empty in the process of computing 210 a composite texture image 310 and occlusion detection and removal. Advantageously, later in the process, if an empty region is not occluded and visible from the new camera, the region can be filled. As result, this multi-view inpainting can cause occluded regions to be filled from each single camera.

At the end of the occlusion detection and removal process, if some regions are still empty, a conventional image inpainting technique can be used to fill it either automatically or interactively as described below. Advantageously, because cameras can be adjusted according to the image correspondences during bundle adjustment of structure from motion, various embodiments of the disclosed subject matter can produce even simple mosaic high-quality images without explicit blending.

Figure 6:
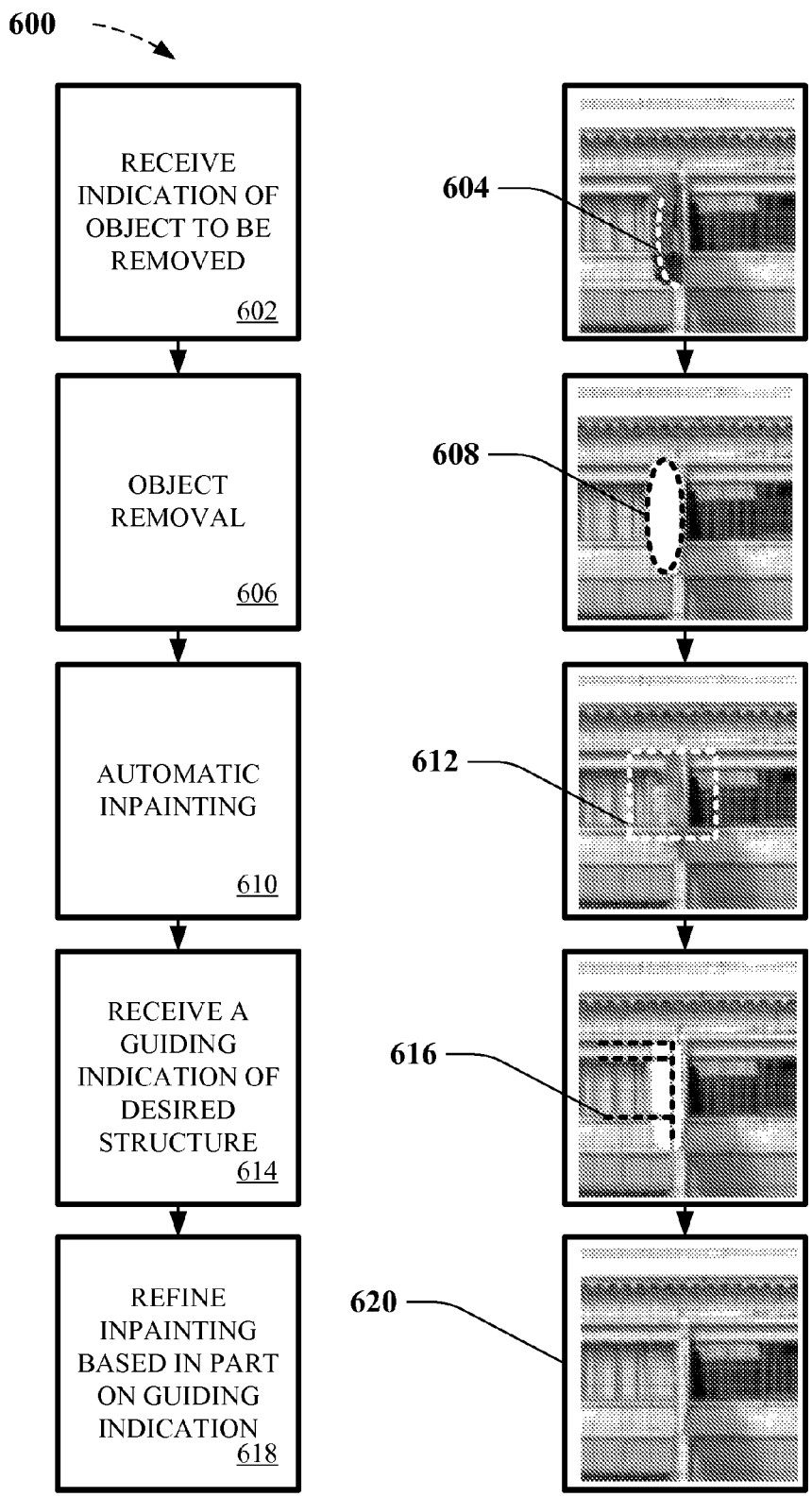
FIG. 6 depicts a schematic block diagram of exemplary methodologies for interactive texture refinement and illustrative examples according various aspects of the disclosed subject matter.

FIG. 6 depicts a schematic block diagram of exemplary methodologies 600 for interactive texture refinement and illustrative examples, according various aspects of the disclosed subject matter. For example, for cases where automatic texture composition results are deemed unsatisfactory, various embodiments of the disclosed subject matter can employ an interface that employ or facilitate methodologies that enable further texture image refinement. For instance, methodologies 600 can comprise receiving an indication of one or more objects to be removed (e.g., a mouse click, digital pen stroke, keyboard input, input from another algorithm, either automated or semi-automated, etc.). As an example, stroke 604 (indicated by white dashed line) can be received by an interface as an indication that the underlying image object is to be removed.

Thus, at 606, the object can be removed, based in part on reliance that stroke 604 was an indication that the underlying image object is to be removed, the result of which is indicated at 608 (indicated by black dashed ellipse). As depicted in FIG. 6, the corresponding region can be automatically extracted based on the input strokes, using techniques known in the art. According to various embodiments of the disclosed subject matter, the removal operation can interpret the most fronto-parallel and photo-consistent texture selection, from the result of Algorithm 1, is not what the user wants. For example, for each pixel, ñ from Line 9 of Algorithm 1 and V should be wrong. Thus, P can be updated to exclude V: P←—O. Then, if P≠∅, Algorithm 1 can be run again.

Otherwise, image inpainting techniques as known in the art can be used for automatically inpainting as in FIG. 6 at 610. Accordingly, automatic inpainting can resume as described or via another mechanism to fill and/or blend the area as indicated at 612 (indicated by white dashed square). In the event that inpainting results remain unsatisfactory, methodologies 600 can further include receiving one or more guiding indications of desired structure 614 to be acknowledged in the area to be inpainted, for example at 226 in methodologies 200 as described above regarding FIGS. 2-3. For example, if the automatic texture filling is poor, an interface can receive important missing structural information such as by receiving one or more strokes indicating one or more curves or line segments from the known to the unknown regions as in FIG. 6 at 616.

For instance, at 616 (indicated by black dashed lines), the interface has received several horizontal lines and one vertical line as guiding indications of desired structure. Thus, image patches can be synthesized according to known techniques along these indications in the unknown region using patches selected around the curves in the known region, for example, by Loopy Belief Propagation to find the optimal patches. After completing the structural propagation, the remaining unknown regions can be filled or refined using patch-based texture synthesis. As a result, methodologies 600 can include, refining the inpainting (e.g., the area of object removal) based in part on guiding indication at 618.

Façade Decomposition

In various embodiments, a façade can be decomposed 212 as described above in reference to FIGS. 2 and 3, and structured into a DAG of rectilinear elementary patches. In an aspect, a systematic and automatic decomposition scheme of façades allows for both analysis and reconstruction of the façade. Advantageously, decomposition achieved through a recursive subdivision preserves the architectural structure by obtaining a DAG representation of the façade by both top-down subdivision and bottom-up merging with local bilateral symmetries to handle repetitive patterns. The DAG representation naturally encodes the architectural shape prior of a façade and enables the depth of the façade to be optimally computed on the surface and at the level of the subdivided regions.

Accordingly, in decomposing a façade the façade structure can be described best by segmenting it to a minimal number of elements. It can be understood that for particular façades (e.g., buildings, city street views, etc.), the façades inherit natural horizontal and vertical directions apparent in conventional construction methods. Accordingly, as a first approximation, visible horizontal and vertical lines can be utilized to construct an irregular partition of the façade plane into rectangles of various sizes. As an advantage, this partition can be said to capture the global rectilinear structure of the façades and buildings and while keeping all, or significantly all, discontinuities of the façade substructures.

However, this usually results in an over-segmentation of an image into patches. But this over-segmentation has several advantages. First over-segmenting lines can also be regarded as auxiliary lines that regularize the compositional units of the façades and buildings. As a further advantage, some rectilinear structures of the façade that are otherwise hidden during the construction can also be rediscovered by this over-segmentation process.

Figure 8:
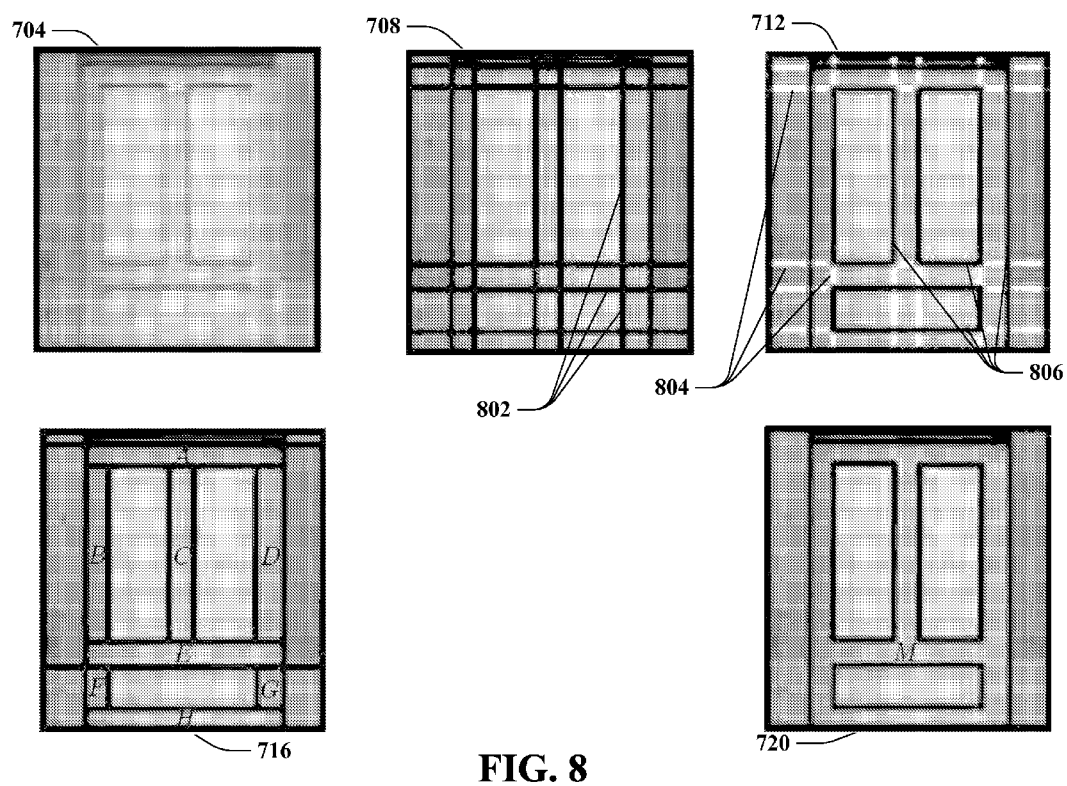

Thus, in various embodiments, the disclosed subject matter provides methodologies 700 for decomposing a façade. FIG. 7 depicts an exemplary non-limiting block diagram of methodologies 700 for decomposing a façade and illustrative examples of façade decomposition. FIG. 8 depicts these examples of façade decomposition zoomed in to further illustrate details of methodologies 700. For instance, to discover structure inside a façade (e.g., hidden structure detection), the edge can be detected at 702 for a reference texture image 704, using techniques known in the art. For example, a Canny edge detection is described herein for the purposes of illustration and not limitation. Thus, it can be understood that additional edge detection techniques can be applicable to the various embodiments described herein.

With such edge maps 702 available (e.g., an edge map (not shown) such as can be produced from a Canny edge detection algorithm), a Hough transform can be used to extract hidden structure at 706 by recovering hidden structure lines (e.g., indicated as a grid formed by dark lines 802 in the interior of reference texture image 708). For example, the Hough transform is family of feature extraction techniques used in image analysis, computer vision, and digital image processing. The typical purpose of such techniques is to find imperfect instances of objects within a certain class of shapes by a voting procedure. This voting procedure can be carried out in a parameter space, from which object candidates are obtained as local maxima in a so-called accumulator space that can be explicitly constructed by an algorithm for computing the Hough transform.

In further non-limiting embodiments, the direction of the Hough transform can be constrained to recover lines that are substantially horizontal and/or substantially vertical, which frequently occurs in architectural façades, to further improve the robustness. As a result, the detected hidden structure lines (e.g., lines of a family as depicted at 802) form a grid that partition the whole reference image. This grid can be defined as containing many non-overlapping short line segments by taking intersections of Hough lines as endpoints as in image 708. Thus, these line segments can be used as a hypothesis to partition the façade. Accordingly, at 706, methodologies 700 for decomposing a façade can include segmenting the detected hidden structure lines 802 for use as a hypothesis to partition the façade.

While the Hough transformation is useful for structure discovery, because it can extract hidden global information (e.g., hidden structure detection and extraction) from a façade and align line segments to this hidden structure, some line segments in the formed grid may not really be a partition boundary between different regions. Thus, in various embodiments of the disclosed subject matter, a weight, $w_e$, can be defined for each line segment, e, to indicate the likelihood that this line segment is a boundary of two different regions (e.g., determine edge support of segmented hidden structure lines) at 710. In an aspect, the weight can be computed as the number of edge points from Canny edge map (not shown) covered by the line segment. For example, at 712 segmented hidden structure lines have been weighted according to their edge support (e.g., number of edge points from Canny edge map covered by the line segment) which are indicated by light colored lines 804 (e.g., lower edge support) and dark colored lines 806 (e.g., higher edge support). According to a further aspect, segmented lines of hidden structure can be weighted according to an edge support threshold.

It can be understood that the current partition schema is subject to segmentation parameters, the selection of which can impact the degree of segmentation of a partition (e.g. the partition of rectangular patches of a façade in the process of partition). However, it is noted that a somewhat over-segmented partition is not harmful for the purpose of modeling. That is, a perfect partition can aid the regularization of the façade augmentation by depth as discussed above and further described in detail below. Nevertheless, a somewhat imperfect partition (e.g., a relatively over-segmented partition) does not affect the modeling results and optimization when 3D points are dense.

Methodologies 700 can further include recursively subdividing the façade into one or more regions at 714. For instance, a façade can be recursively subdivided into one or more regions at 714 based in part on a size criteria and/or a division hypothesis. As an example, given a region, D, in the texture image (e.g. texture image at 716), region, D, can be divided into two sub rectangular regions, $D_1$ and $D_2$, such that $D=D_1 \cup D_2$, by a line segment L with strongest support from the edge points. After D is subdivided into two separate regions, the subdivision procedure can continue on the two regions, $D_1$ and $D_2$, recursively. The recursive subdivision procedure can be stopped if either the target region, D, is too small to be subdivided (e.g., target region D fails to meet size criteria), or there is not enough support for a division hypothesis (e.g., region D is very smooth).

For a façade, bilateral symmetry about a vertical axis may not exist for the whole façade in certain circumstances, while bilateral symmetry can exist locally. Accordingly, in various embodiments methodologies 700 can employ bilateral symmetry to provide robust subdivision at 714. For instance, for each region, D, the NCC score, $s_D$, of the two halves, $D_1$ and $D_2$, vertically divided at the center of D can be computed. If $s_D$ is greater than a bilateral symmetry threshold (e.g., if $s_D > \eta$) region D can be considered to have a predetermined level of bilateral symmetry. Thus, an edge map of $D_1$ and $D_2$ can be averaged, and recursive subdivision can be performed on $D_1$ only. Finally, the subdivision in $D_1$ can be reflected across the axis to become the subdivision of $D_2$, which two subdivisions can be into the subdivision of D.

Methodologies 700 can further include post-processing the subdivided façade at 718 to merge regions. For instance, while recursive subdivision can preserve boundaries in images of manmade structural styles (e.g., building façades, city façades, etc.), recursive subdivision can also produce undesired fragments that can unnecessarily complicate depth computation and rendering as in texture image 716. Thus, in various embodiments, the disclosed subject matter can employ post-processing to avoid undesired fragments and artifacts to simplify depth computation and rendering.

For example, if two neighboring leaf subdivision regions, A and B, does not have enough support, $s_{AB}$, to separate them (e.g., $s_{AB}$ does meet a support threshold), neighboring leaf subdivision regions, A and B, can be merged into one region. For example, several regions identified as region "A" to region "H" in texture image 716 have been merged to form a single region "M" in 720. According to an aspect, support, $s_{AB}$, to separate two neighbor regions A and B, can defined to be the strongest weight of all the line segments on the border between A and B: $s_{AB} = \max_e \{w_e\}$. It can be understood, however, that weights of line segments can only offer a local image statistic on the border. Thus, a dual information region statistic between A and B can be used more globally to improve robustness.

Figure 9:
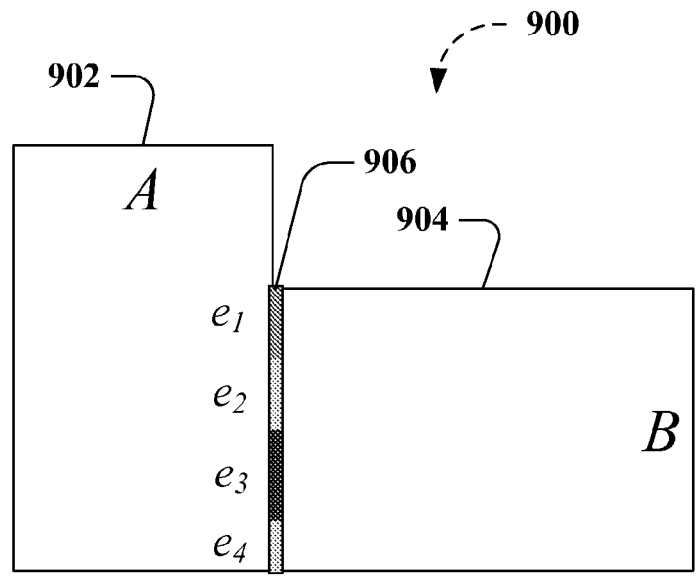
FIG. 9 graphically illustrates concepts of evaluating support for merging regions in methodologies for decomposing a façade.
Figure 9:
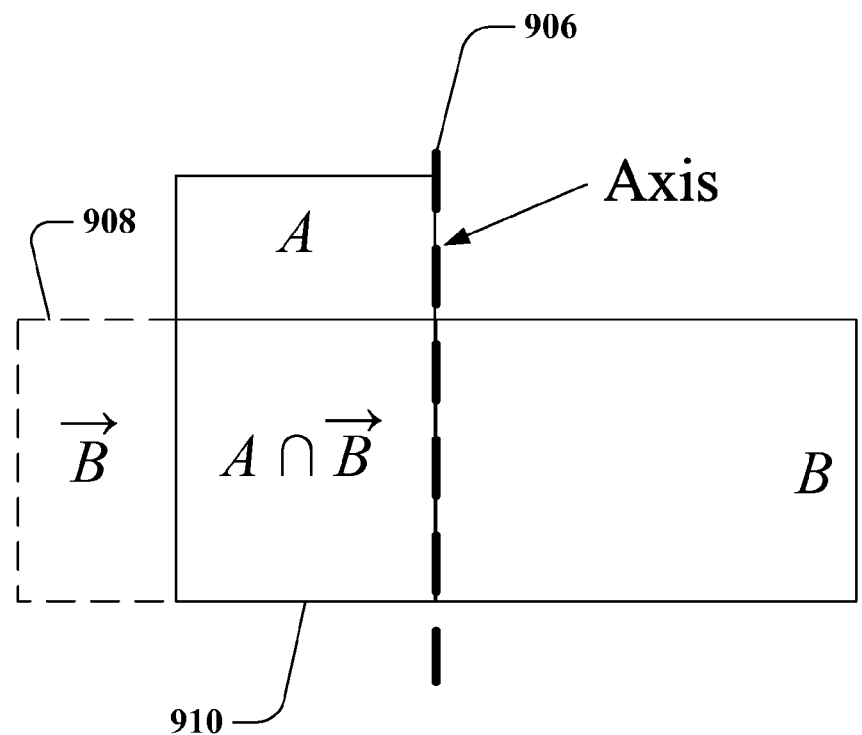

For example, FIG. 9 graphically illustrates concepts of evaluating support for merging regions in methodologies 700 for decomposing a façade. For instance, because regions A 902 and B 904 may not have the same size (e.g., as for regions "E" and "F" of texture image 716), a region statistic similarity can be defined. As a non-limiting example, an axis 906 can be defined on the border between A 902 and B 904, and region B 904 can be mirrored on this axis to have a region, $\vec{B}$ 908. The overlapped region, $A \cap \vec{B}$ 910 between A 902 and $\vec{B}$ 908 can be defined to be pixels from A 902 with locations inside $\vec{B}$ 908. In a similar manner (not shown), $\overleftarrow{A} \cap B$ contains pixels from B 902 with locations inside $\overleftarrow{A}$, which can then be mirrored to become $\overleftrightarrow{A \cap B}$ according the same axis. The NCC between $A \cap \hat{B}$ 910 and $\overleftrightarrow{A \cap B}$ can be used to define the regional similarity of A 902 and B 904. As a result, it is apparent that only the symmetric part of A 902 and B 904 is selected for region comparison. As a consequence, the effect of other far-away parts of the region can be avoided, which can happen if the size of A 902 and B 904 is dramatically different and global statistics, such as the color histogram, are used. Weighted by a parameter, κ the support, $s_{AB}$, to separate two neighboring regions, A and B, can be defined as in Equation 1.

$$s_{AB} = \max_e \{w_e\} - \kappa NCC\left(A \cap \vec{B}, \overleftrightarrow{A \cap B}\right). \quad \text{(Eqn. 1)}$$

It can be understood that that the representation of the façade is a binary recursive tree before merging and a Directed Acyclic Graph after region merging. Advantageously, the DAG representation can innately support the Level of Detail rendering technique, which involves decreasing complexity of a 3D object representation as it moves away relative to a viewer or according other metrics such as object importance, eye-space speed, position, etc. Level of detail techniques can increase the efficiency of rendering by decreasing the workload on graphics pipeline stages such as vertex transformations, for example. As a result, the intentionally reduced visual quality of the 3D model is often unnoticed because of the small effect on object appearance when the modeled objects are represented at a distance or represented to be moving fast.

Thus, when great details are demanded, such as for picture-quality close-ups of a 3D façade model, the rendering engine can go down the rendering graph of the DAG representation to expand all detailed leaves and render them correspondingly. Likewise, at intermediate viewing distances, speeds, or other appropriate contexts, an intermediate node is rendered and all its descendents are pruned at rendering time.

Figure 10:
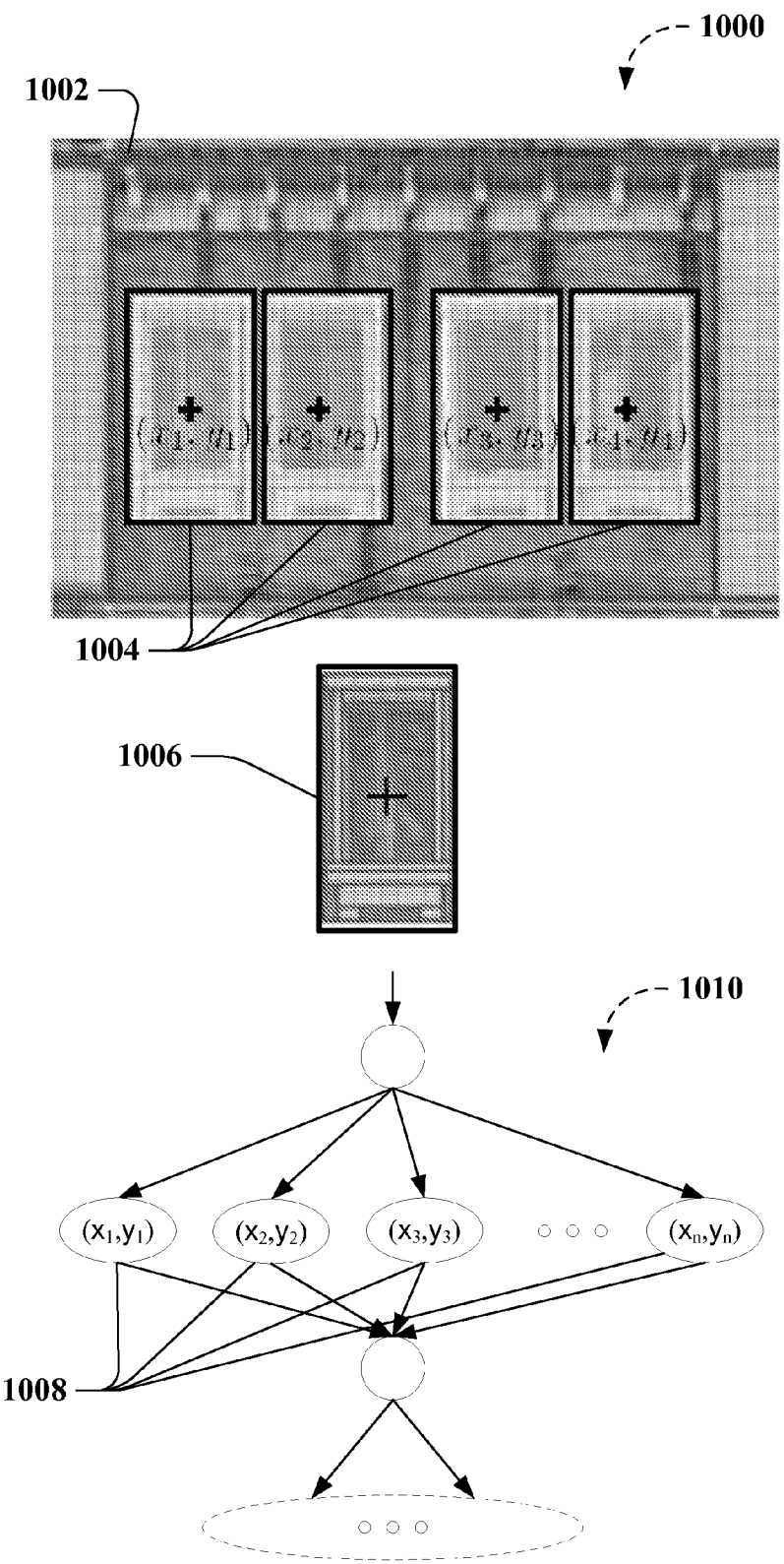
FIG. 10 depicts an exemplary reference texture image with a locally repetitive pattern to demonstrate further advantages of various aspects of the disclosed subject matter.

FIG. 10 depicts an exemplary reference texture image 1002 with a locally repetitive pattern 1004 to demonstrate further advantages of various aspects of the disclosed subject matter. As can be understood, repetitive patterns of a façade can exist locally in many façades. For example, many locally repetitive patterns 1004 of a façade exist as windows. Conventional methods for accounting for locally repetitive patterns have used complicated techniques for synchronization of subdivisions between different windows. In various non-limiting embodiments, the disclosed subject matter can advantageously maintain a single subdivision representation for the same type of locally repetitive pattern 1004 (e.g., repetitive patterns of a façade existing as windows) to save storage space and to ease the synchronization task.

For example, referring to FIG. 10, a window template 1006 can be detected automatically (e.g., by a trained conventional model) or manually indicated on the texture images. Templates can be matched across the reference texture image (e.g., matched by determining whether the NCC exceeds a threshold as measure of correlation). If one or more good matches exist, the template can be aligned to the horizontal or vertical direction (e.g., by a hierarchical clustering), and the edge maps on these regions (e.g., Canny edge maps) can be averaged. In a further aspect, during the subdivision, each matched region can be isolated by shrinking a bounding rectangle on the average edge maps until it is snapped to strong edges, and each matched region can be regarded as a whole leaf region.

It can be understood that the edges inside these isolated regions should not affect the global structure, and thus, these edge points can be ignored during the global subdivision procedure. Then, as in FIG. 10, all the matched leaf regions 1008 can be linked to a root of a common subdivision DAG 1010 for that type of locally repetitive pattern 1004 (e.g., repetitive patterns of a façade existing as windows). For instance, by introducing two-dimensional (2D) translation nodes for the pivot position, the matched leaf regions 1008 can be linked to the root. In further non-limiting implementations, recursive subdivision can be executed again on the average edge maps of all matched regions. To further preserve photo realism, textures in these regions can be restricted to these regions, with only the subdivision DAG and their respective depths shared. Furthermore, in various embodiments, the vertical bilateral symmetry can be taken as a hard constraint to improve the robustness of the subdivision for certain types of locally repetitive patterns 1004 (e.g., repetitive patterns of a façade existing as windows, doors, etc.).

Figure 11:
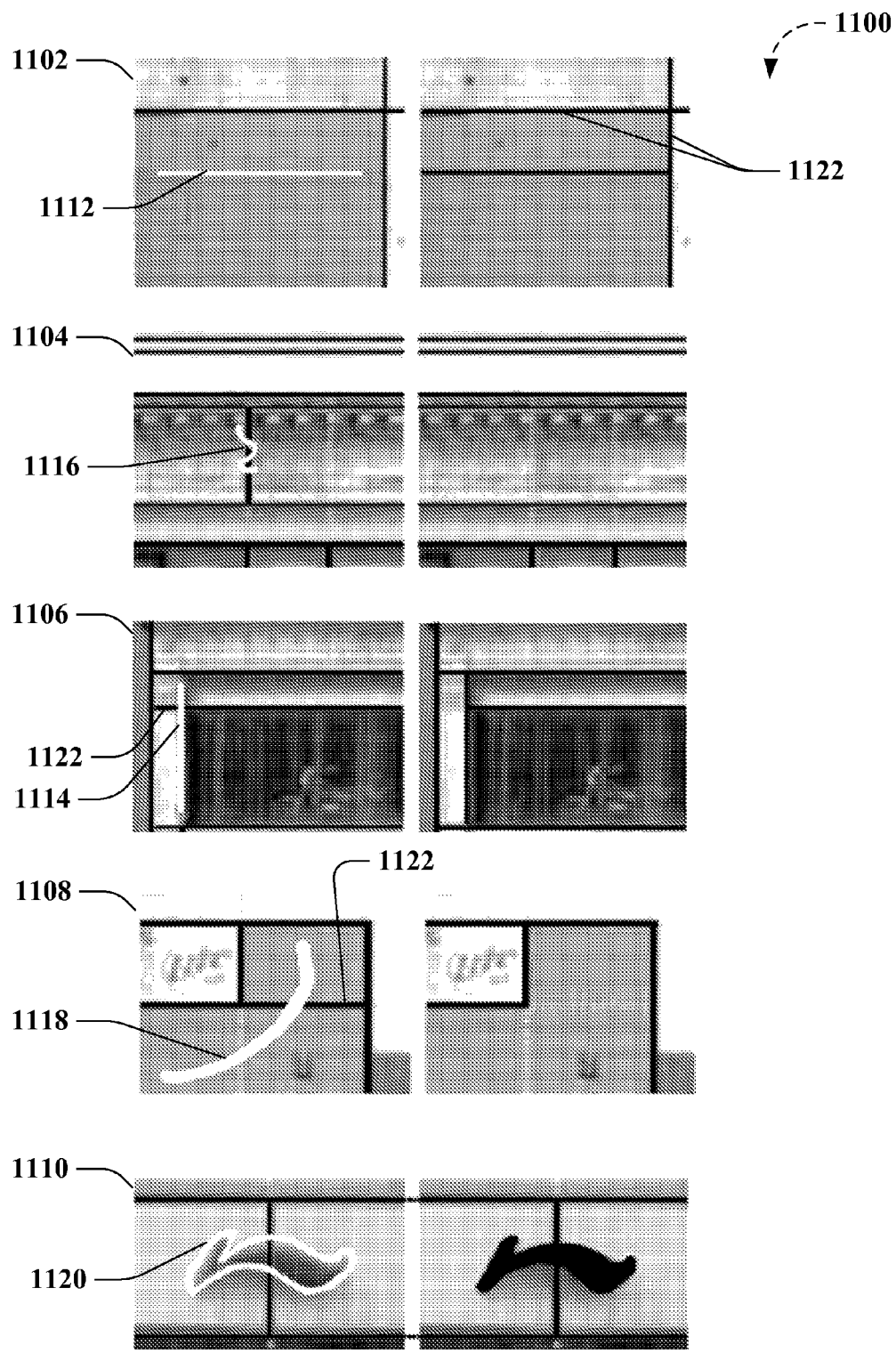
FIG. 11 depicts a series of texture images demonstrating various implementations for subdivision refinement in accordance with further aspects of the disclosed subject matter.

FIG. 11 depicts a series 1100 of texture images demonstrating various implementations for subdivision refinement in accordance with further aspects of the disclosed subject matter. In most situations, automatic subdivision can provide satisfactory results. However, further refinement of the subdivision layout can be performed according to various embodiments. Thus, three line operations and two region operations can be employed via an interface. Accordingly, methodologies 700 can further include receiving instructions for refinement of a façade in the process of subdivision at 722. For instance, methodologies 700 can receive refinement instructions via an interface that can employ or facilitate methodologies that enable further subdivision refinement.

As an example, methodologies 700 can comprise receiving instructions to add 1102, delete 1104, change 1106, group 1108, carve 1110, and/or otherwise modify the developing subdivision via the interface (e.g., receiving a mouse click, digital pen stroke, keyboard input, input from another algorithm, either automated or semi-automated, etc.). As depicted in FIG. 11, receiving instructions can include receiving instructions, strokes, or annotations comprised of horizontal annotations 1112, vertical annotations 1114, and or free-form strokes or annotations (e.g., annotations 1116, 1118, and 1120). The instructions (e.g., strokes or annotations) are depicted as white colored lines, whereas lines created during automatic subdivision are in black (e.g., 1122, etc.). In response to receiving the instructions for refinement at 722, methodologies 700 can further include refinement operations at 714 as depicted in FIG. 11, such as adding a line (e.g., as in 1102), deleting a line (e.g., as in 1104), a combination of adding and deleting lines (e.g., as in 1106), merging regions (e.g., as in 1108), and so on.

For example, instructions can be received at 722 to indicate a partition (e.g., as in 1102) should be added. As a result, edge points near the stroke can be forced to become salient, which can enable the subdivision engine to determine the line segment and partition the region. As further example, such instructions can include a zigzag stroke to cross out a line segment to indicate deletion of a line is desire to refine the façade subdivision (e.g., as in 1104). In the event that a new partition is desired that conflicts with one or more existing partitions, deletion of one or more partition line segments and followed by addition of one or more new line segments can be performed. However, in further embodiments a conflicting stroke can be indicated (e.g., as in 1106) and the existing line segment that conflicts can be automatically deleted and a new line segment can be automatically constructed. Advantageously, according to various embodiments, in such an operation, all descendants with the target region as the root node in the DAG representation can be triggered to be recomputed.

As described, various embodiments employing automatic subdivision can be constrained to operate substantially on horizontal and vertical directions for robustness and simplicity. Thus in addition to the above described refinement operations at 714, methodologies 700 can further include refinement operations at 714 that enable sketching of arbitrarily shaped objects, for those image objects that appear less frequently. As a result, various embodiments can employ a "carve out" operator (e.g., as in 1120 by drawing curves or line segments), as depicted in FIG. 11, to include such arbitrarily shaped objects in the façade representation. In this way, any shape can be extruded, and thus supported. In addition, according to further aspects each subdivided patch of the façade can be augmented with a depth optimized using the 3D points cloud.

Figure 12:
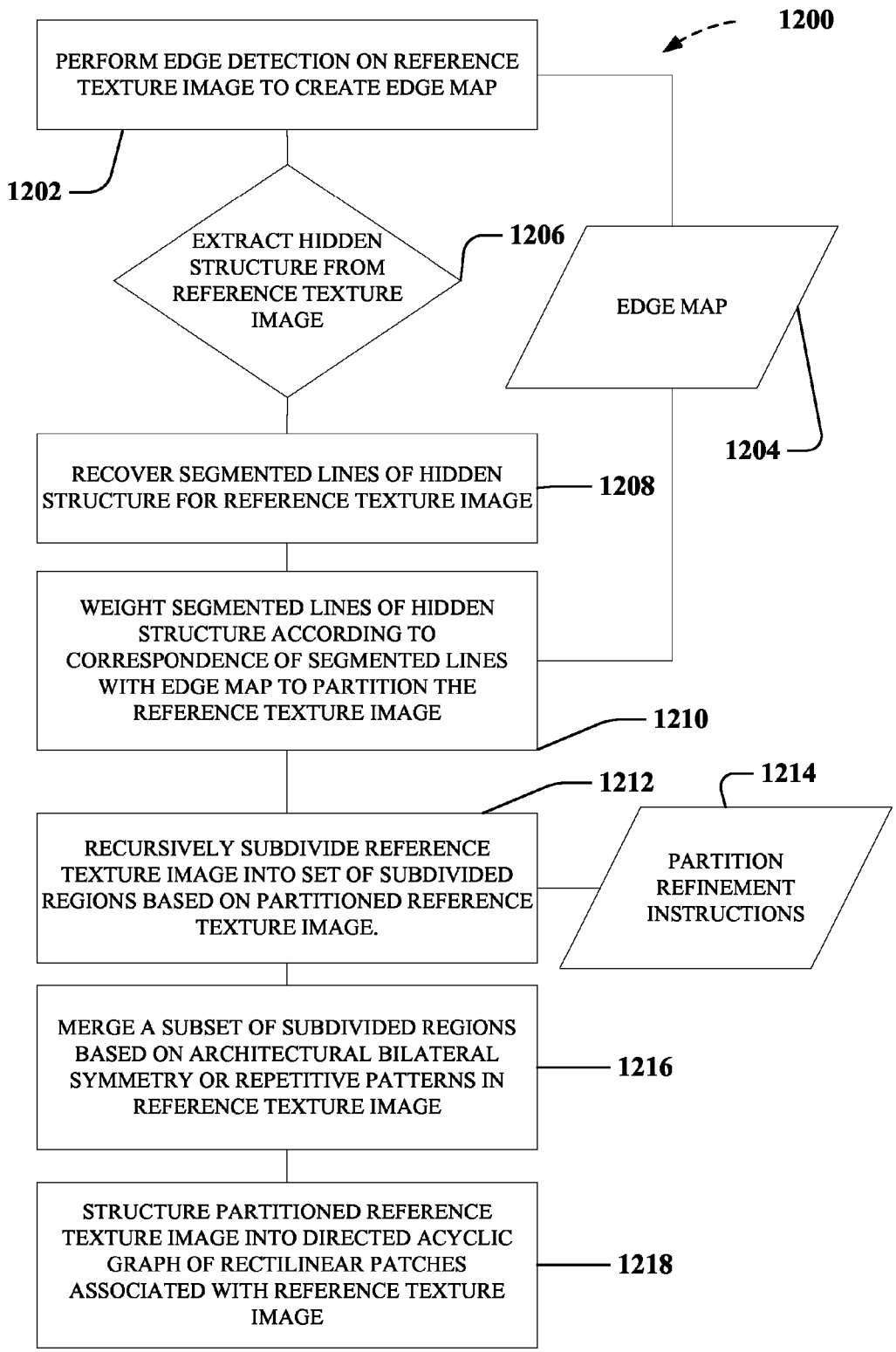
FIG. 12 depicts a flowchart demonstrating various aspects of exemplary non-limiting methodologies for façade image decomposition.

Accordingly, in various embodiments of the disclosed subject matter, methodologies for façade image decomposition are provided. For instance, FIG. 12 depicts various aspects of exemplary non-limiting methodologies 1200 for façade image decomposition. For example, at methodologies 1200 can comprise performing an edge detection 1202 on a reference texture image to create the edge map 1204 as described above regarding FIGS. 7-11. If it is desired to extract hidden structure from the reference texture image at 1206, segmented lines of hidden structure can be recovered at 1208 for the reference texture image.

In addition, as further described above, methodologies 1200 can further include weighting segmented lines of hidden structure at 1210 according to the correspondence of the segmented lines with an edge map 1204 for the reference texture image to partition the reference texture image. According to an aspect, at 1212, methodologies 1200 for façade image decomposition can further include recursively subdividing the reference texture image into a set of subdivided regions based on the partitioned reference texture image. For instance, at 1212 subdividing the reference texture image into the set of subdivided regions can include receiving partition refinement instructions 1214.

At 1216, according to further embodiments of methodologies 1200 for façade image decomposition, a subset of the set of subdivided regions can be merged based on bilateral symmetry (e.g., architectural bilateral symmetry) and/or repetitive patterns in the reference texture image. Furthermore, methodologies 1200 can include structuring the partitioned reference texture image into a directed acyclic graph of rectilinear patches associated with the reference texture image at 1218.

Façade Augmentation

As further described above, a subdivision of the façade plane can be obtained 714 during façade decomposition 212 in methodologies for image-based façade modeling 200 and 300. Regarding FIGS. 2 and 3, the subdivision regions can be assigned a depth and augmented accordingly at 216. Note that in the event that the 3D points determined at 204 are not dense, a possibility exists that subdivision regions are not assigned a valid depth.

In various non-limiting implementations, depths can be obtained from a MAP estimation of MRF. For instance, in conventional stereo methods, a reference image can be selected and a disparity or depth value can be assigned to each of its pixels. Thus, the problem can be formulated as a minimization of the MRF energy functions to provide a clean and computationally tractable formulation. However, a key limitation of these conventional solutions is that the smoothness term imposed by the MRF can be viewpoint dependent. In other words, if a different view were chosen as a reference image, then different results would be obtained.

Accordingly, in various embodiments, a representation of the façade with subdivision regions, rather than employing a depth map on an image plane, the disclosed subject matter enables extending MRF techniques to recover a surface for each façade, and/or a depth map on the flat façade plane. As a result, an MRF can be overlaid on the façade surface and an image and viewpoint independent smoothness constraint can be defined. Thus, various embodiments of methodologies for image-based façade modeling 200 and 300 can include overlaying an MRF on a façade surface and employing image and viewpoint independent smoothness constraint to aid in façade augmentation 216.

For example, to accomplish a depth optimization according to the disclosed subject matter, consider the following. Suppose the graph G=(V, E), where V={$s_k$} can be defined as the set of all sites and E can be defined as the set of all arcs connecting adjacent nodes. The labeling problem is to assign a unique label $h_k$ for each node $s_k \in V$. As can be understood, the solution H={$h_k$} can be obtained by minimizing a Gibbs energy according to Equation 2.

$$E(H) = \Sigma_{s_k \in V} E_k^d(h_k) + \lambda \Sigma_{(s_k, s_l) \in V} E_{(k,l)}^d(h_k, h_l),$$ (Eqn. 2)

The term $E_k^d(h_k)$ can be defined as the data cost (e.g., a likelihood energy), that encodes the cost when the label of site $s_k$ is $h_k$, and $E_{(k,l)}^d(h_k, h_l)$ is the prior energy, denoting the smoothness cost when the labels of adjacent sites, $s_k$ and $s_l$, are $h_k$ and $h_l$, respectively.

Assume a set of M sample points, $\{s_k\}_{k=1}^M$, and denote the normal direction of the façade of the initial base surface to be n. The sites of MRF correspond to height values, $h_1, \ldots, h_M$, measured from sample points, $s_1, \ldots, s_M$, along the normal n. The labels $\{H_1^k, \ldots, H_L^k\}$ can be defined a set of possible height values that variables $h_k$ can take. If the k-th site is assigned label $h_k$ then the relief surface passes through 3D point $s_k + h_k$ n. In conventional solutions, base surface sample points are uniformly and densely defined. However, various embodiments employing the disclosed graph layout based on the subdivision region provide relatively more efficient approximation optimization.

Figure 13:
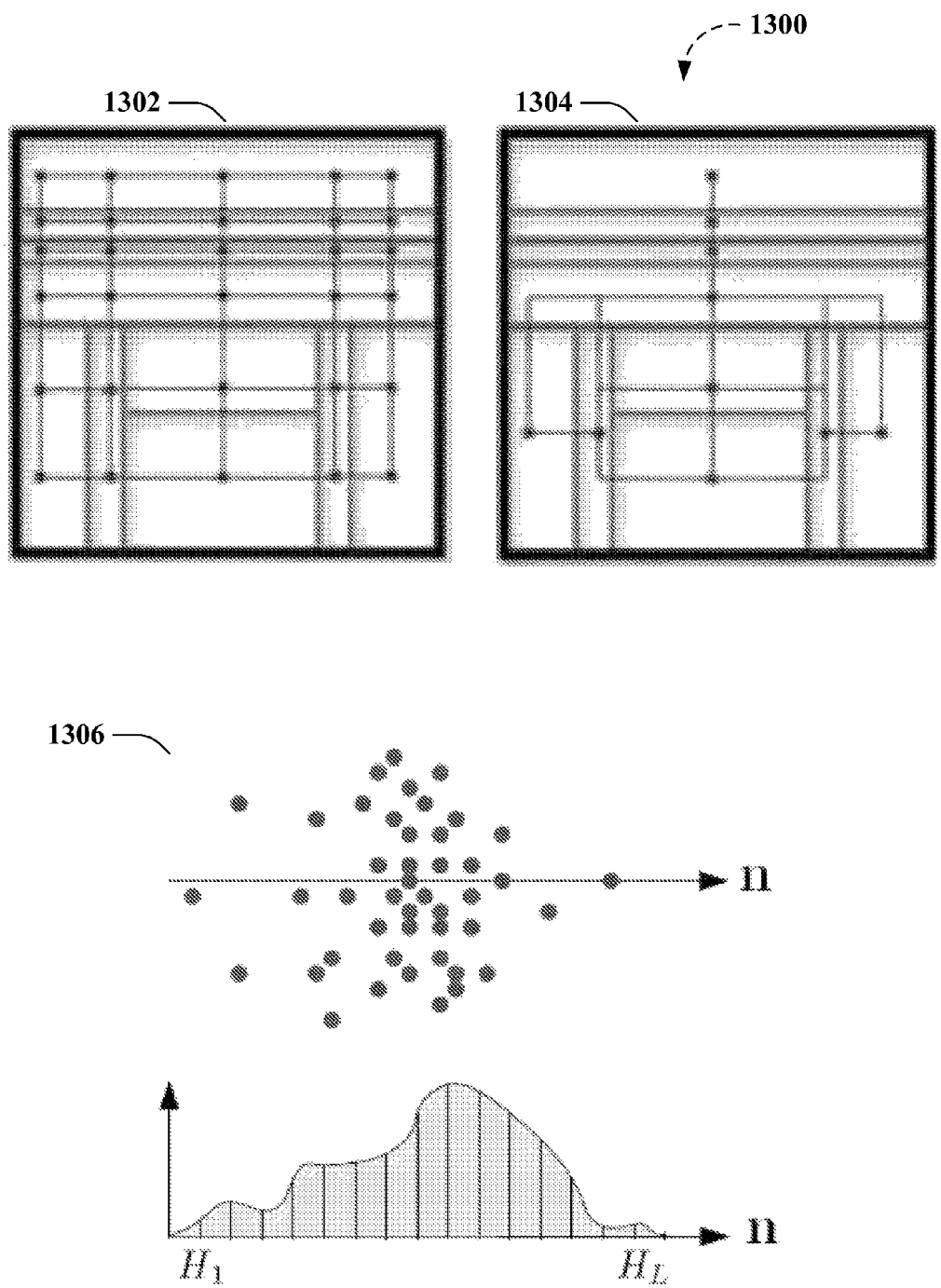
FIG. 13 depicts possible choices for defining the Markov Random Field (MRF) graph on a subdivision, according to further aspects of the disclosed subject matter.

For example, FIG. 13 depicts possible choices for defining the MRF graph on the subdivision, according to further aspects of the disclosed subject matter. Layout 1 (1302) can be good for illustrating concepts since it is a regular grid. However, it can be understood that there can be several sites representing the same subdivision region, resulting unnecessary complication in the definition of MRF and can result in unnecessarily increased hardware requirements for optimization. As a result, in an aspect, embodiments of the disclosed subject matter can employ an optimized layout. In a non-limiting example, each subdivision region can be represented with a single site (e.g., a site centered at each region) such as in Layout 2 (1304). However, different subdivision regions can have widely varying areas, which can be taken into account in the original MRF definition.

Accordingly, the data cost vector, $c_k^d$, of each site, $s_k$, can be weighted by the area, $a_k$, in the k-th subdivision region, e.g., $E_k^d = a_k c_k^d$, and the smoothness cost matrix, $c_{(k,l)}^s$, can be weighted by the length $l_{(k,l)}$ of the border edge between the k-th subdivision region and the l-th subdivision region, e.g., $E_{(k,l)}^s = l_{(k,l)} c_{(k,l)}^s$.

Traditionally, data cost can be defined as photo consistency between multiple images. In various implementations, the disclosed subject matter can employ photo consistency by means of a point set that can be obtained from Structure From Motion at 204. Such methods could said to be a somewhat backwards way of using photo consistency. However, such a process can be more robust and can be attributed as a reason for achieving increased accuracy in top performing conventional multi-view stereo methods.

As depicted in FIG. 13 at 1306, 3D points close to the working façade (e.g., within 0.8 meter) and with projections inside the subdivision region corresponding to the k-th site, $s_k$, can be projected onto the normal direction, n, to obtain a normalized height histogram, $\theta_k$, with the bins $\{H_1^k, \ldots, H_L^k\}$. Thus, the cost vector can be defined as $c_k^d = \exp\{\theta_k\}$. According to a further aspect, if no 3D point exists for a particular region (e.g., due to occlusion), a uniform distribution can be chosen for $\theta_k$, and smoothness cost can be defined as in Equation 3.

$$c_{(k,l)}^s = \exp\{z_{(k,l)} \| (s_k + h_k n) - (s_l + h_l n) \| \}$$ (Eqn. 3)

Note that, in various non-limiting embodiments, $z_{(k,l)}$ can be defined as the inverse symmetric Kullback-Leibler divergence between normalized color histograms of the k-th region and the l-th region from the reference texture image. Accordingly, this definition penalizes the Euclidean distance between neighboring regions with similar texture and favors minimal area surfaces. Note that $s_k$ is placed on the center of the subdivision region, with the depth equal to the peak of the height histogram, $\theta_k$, with $\{H_1^k, \ldots, H_L^k\}$ adaptively defined to span four standard deviations of the projection heights for the point set. In a further aspect, after the costs are defined on the graph, the energy can be minimized by Max-product Loopy Belief, for example.

Referring again to FIGS. 2-3, while for most situations, automatically reconstructed depth can produce visually appealing results, some façades such as buildings can be improved by adding additional details. Accordingly, in various implementations of methodologies 200 and 300, depth assignment instruction can be received at 224 via an interface to facilitate interactive depth assignment. As an example, in various embodiments, depth assignment instructions can be input via an interface that operates in 2D image space for ease of manipulation.

As a further example, suppose that depths from another region are desired to be used for a current region of interest. If it is not easy to paint the corresponding depth directly, the depth can be transferred from another region by instructions that indicate source and target regions (e.g., dragging an arrow line from a source region to a target region in a depth assignment mode of an interface). As yet another example, instructions can be received 224 to constrain relative depth between two regions (e.g., by dragging a two-circle ended line in a depth assignment mode of an interface). Thus, sign symbols in the circles can indicate the order, with the radius of the circles to represent the depth difference (e.g., controlled by the + and − key on the keyboard). Accordingly, the difference can be taken as a hard constraint in the MRF optimization by merging two nodes in the layout into one and updating the data and smoothness costs accordingly. These and other instructions relative to depth assignment can be received at 224, according to various embodiments of methodologies 200 and 300.

Figure 14:
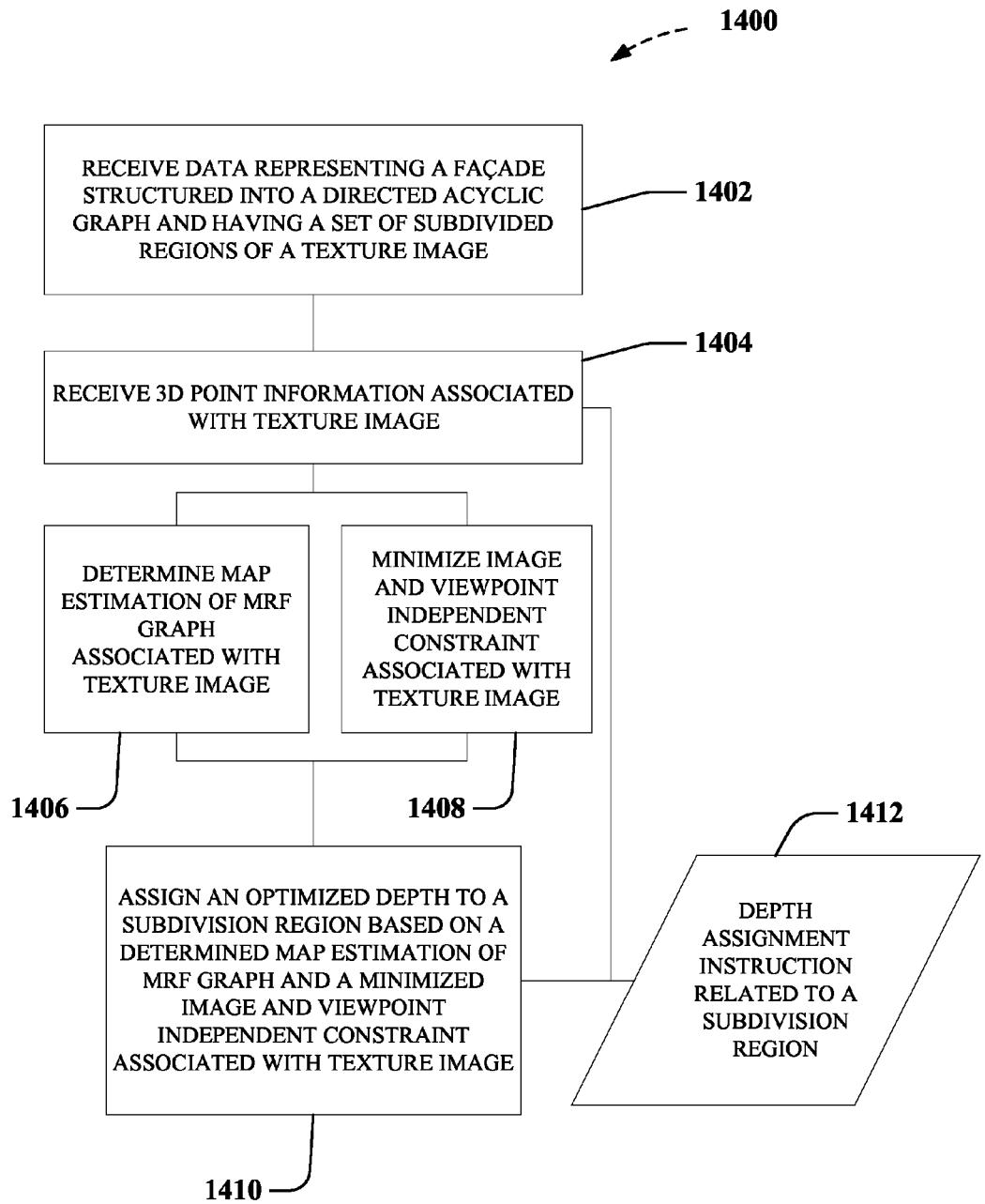
FIG. 14 depicts a flowchart demonstrating various aspects of exemplary non-limiting methodologies for façade augmentation in a façade modeling system.
Figure 15:
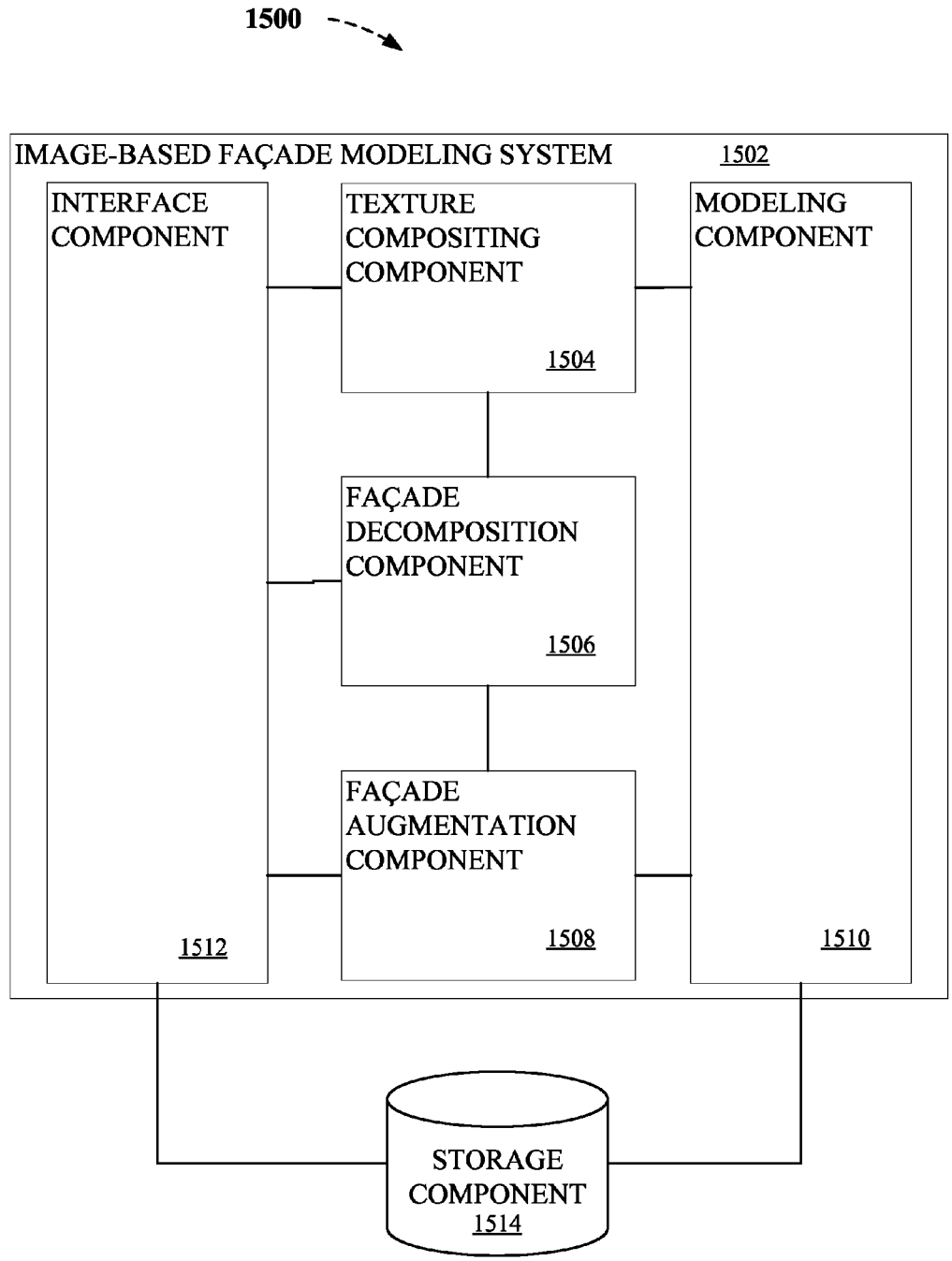
FIGS. 15-19 depict exemplary non-limiting functional block diagrams for implementing image-based façade modeling systems and devices in accordance with various aspects of the disclosed subject matter.

Thus, in various embodiments of the disclosed subject matter, methodologies for façade augmentation in a façade modeling system are provided. For instance, FIG. 14 depicts various aspects of exemplary non-limiting methodologies 1400 for façade augmentation in a façade modeling system. As an example, at 1402, methodologies 1400 can comprise receiving data representing a façade structured into a directed acyclic graph and having a set of subdivided regions of a texture image. In addition, three-dimensional point information associated with the texture image can be received at 1404. According to various aspects, methodologies 1400 for façade augmentation can further include determining the maximum a posteriori estimation of the Markov Random Field graph at 1406 and/or minimizing image and viewpoint independent constraint associated with the texture image at 1408 as further described above.

As a further example, at 1410, embodiments of methodologies 1400 can assign an optimized depth to a subdivision region in the set of subdivided regions based on the maximum a posteriori (MAP) estimation of a Markov Random Field (MRF) graph and the minimized image and viewpoint independent constraint associated with the texture image. For instance, as described above, in various implementations of methodologies 1400, the three-dimensional point information associated with the texture image can be used to determine the optimized depth associated with the at least one subdivision region. In addition, various implementations of methodologies 1400 for façade augmentation can assign an optimized depth based on a received depth assignment instruction 1412 related to a subdivision region.

In view of the methodologies described supra, systems and devices that can be implemented in accordance with the disclosed subject matter will be better appreciated with reference to the functional block diagrams of FIGS. 15-19. While, for purposes of simplicity of explanation, the functional block diagrams are shown and described as various assemblages of functional component blocks, it is to be understood and appreciated that such illustrations or corresponding descriptions are not limited by such functional block diagrams, as some implementations may occur in different configurations Moreover, not all illustrated blocks may be required to implement the systems and devices described hereinafter.

Exemplary Façade Modeling Systems

FIGS. 15-19 depict exemplary non-limiting functional block diagrams for implementing image-based façade modeling systems and devices in accordance with various aspects of the disclosed subject matter. It is to be appreciated that, according to the various methodologies described herein (e.g., regarding the various figures and related descriptions), the various components and/or subcomponents can be implemented as computer executed components as further described below regarding FIGS. 23-24. For example, according to various implementations, components described herein can be configured to perform applicable methodologies, or portions thereof, disclosed herein by standard software programming techniques and executing the configured components on a computer processor.

To that end, exemplary non-limiting image-based façade modeling systems 1502 can comprise a texture compositing component 1504, for example, that can facilitate methodologies described supra, regarding FIGS. 2, 3, 4-6, etc. In various non-limiting implementations, image-based façade modeling systems 1502 can include façade decomposition component 1506 and a façade augmentation component 1508, for example, that can facilitate methodologies described supra, regarding FIGS. 2, 3, 4, 7, 12, 14, etc. In a further aspect, exemplary image-based façade modeling systems 1502 can further include a modeling component 1510 that can, among other things, store, modify, generate, send and/or receive approximate models, geometry models, generate textured façades, create 3d building models, etc., for example, as described supra, regarding FIGS. 2, 3, 4, 6, 7, 12, 14, etc. In yet another aspect, image-based façade modeling systems 1502 can include an interface component 1512, that can, among other things, receive instructions for refining subdivisions or partitions, instructions for assigning depth to subdivisions or partitions, guiding instructions for image refinement during texture compositing, receive or store data (e.g., edge maps, reference texture images, sequences of images, DAG, textures, etc.) to storage component 1514.

Figure 16:
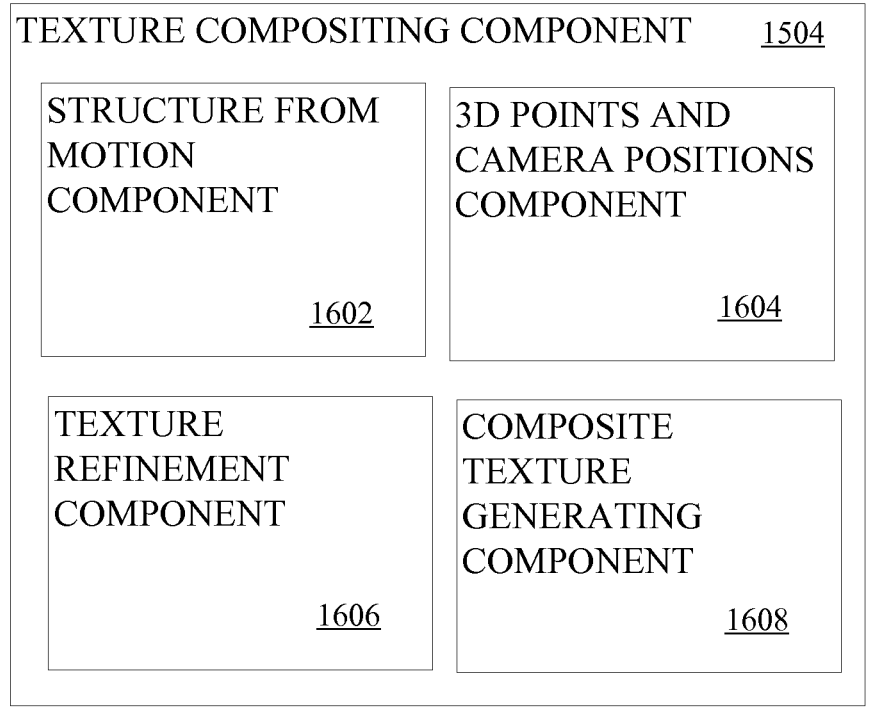

FIG. 16 depicts exemplary non-limiting functional block diagram of a texture compositing component 1504. As described above, a texture compositing component 1504 can, for example, facilitate methodologies described supra, regarding FIGS. 2, 3, 4, 6, etc. Thus, an exemplary texture compositing component 1504 can comprise one or more of a structure from motion component 1602, a 3D points and camera positions component 1604, a texture refinement component 1606, and a composite texture generating component 1608. It should be understood that the various component parts of an exemplary texture compositing component 1504 can be configured according to perform the respective methodologies, or portions thereof, describe herein.

Figure 17:
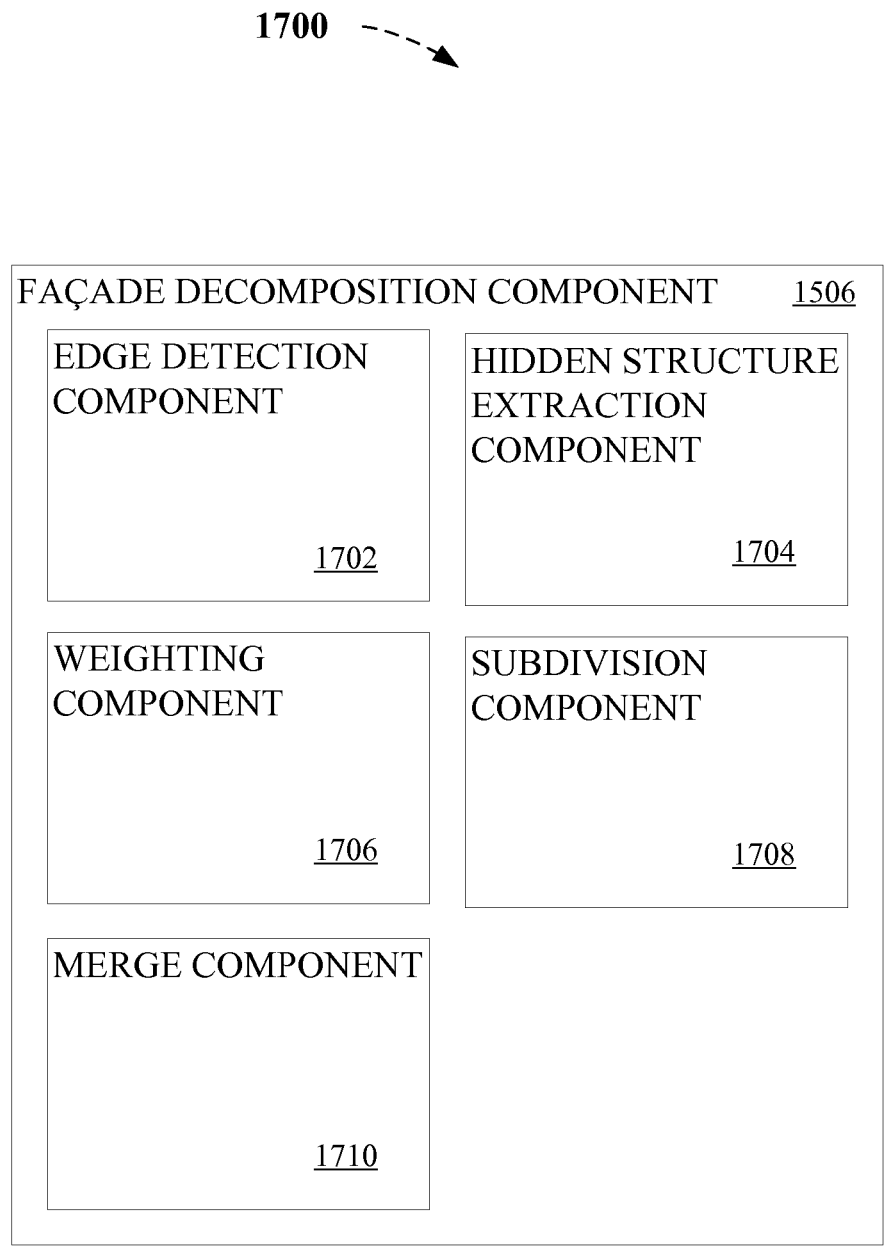

Regarding FIG. 17, an exemplary non-limiting functional block diagram of a façade decomposition component 1506 is depicted. As discussed, exemplary non-limiting façade decomposition component 1506 can, for example, facilitate methodologies described supra, regarding FIGS. 2, 3, 4, 7, 12, 14, etc. Accordingly, an exemplary façade decomposition component 1506 can comprise one of more of an edge detection component 1702, a hidden structure extraction component 1704, a weighting component 1706, a subdivision component 1708, and a merge component 1710. It should be understood that the various component parts of an exemplary façade decomposition component 1506 can be configured according to perform the respective methodologies, or portions thereof, describe herein.

Figure 18:
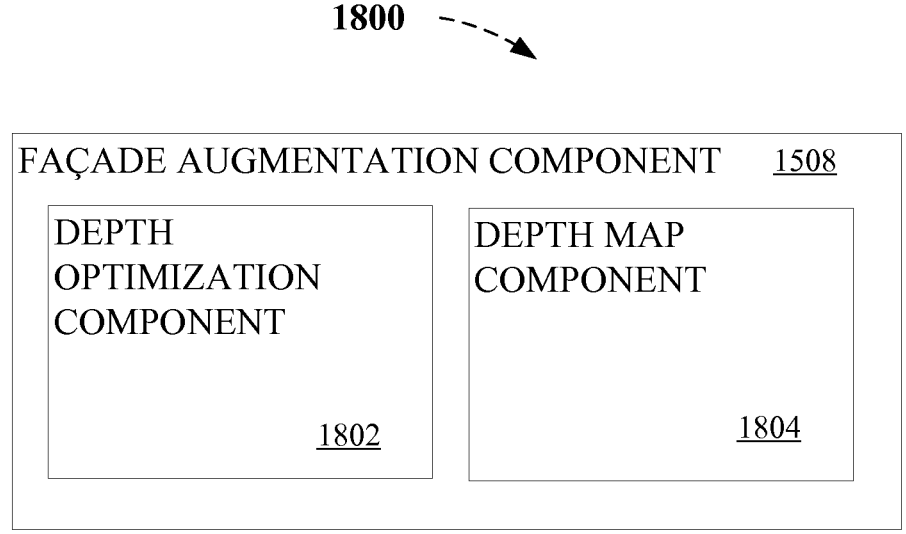

In addition, FIG. 18 depicts exemplary non-limiting function block diagram of a façade augmentation component 1508. As mentioned, exemplary façade augmentation component 1508 can, for example, facilitate methodologies described supra, regarding FIGS. 2, 3, 4, 7, 12, 14, etc. To that end, a non-limiting façade augmentation component 1508 can comprise one or more of a depth optimization component 1802 and a depth map component 1804. It should be appreciated that the various component parts of an exemplary façade augmentation component 1508 can be configured according to perform the respective methodologies, or portions thereof, describe herein.

Figure 19:
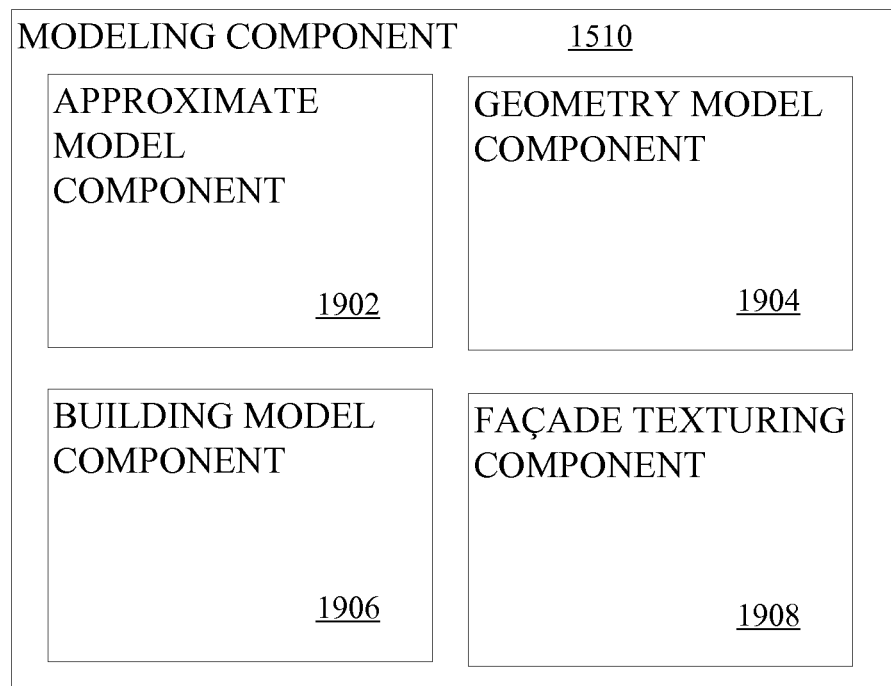

FIG. 19 depicts exemplary non-limiting function block diagram of a modeling component 1510. As described above, modeling component 1510 can, among other things, store, modify, generate, send and/or receive approximate models, geometry models, generate textured façades, create 3d building models, etc., for example, as described supra, regarding FIGS. 2, 3, 4, 6, 7, 12, 14, etc. Consequently, an exemplary non-limiting implementation of a modeling component 1510 can comprise one or more of an approximate model component 1902, a geometry model component 1904, a building model component 1906, and a façade texturing component 1908. It should be appreciated that the various component parts of an exemplary modeling component 1510 can be configured according to perform the respective methodologies, or portions thereof, describe herein.

To that end, an exemplary non-limiting image-based façade modeling system 1502 can comprise a façade decomposition component 1506 that recursively subdivides a reference texture image into a set of subdivided regions and structures the reference texture image into a directed acyclic graph of rectilinear patches associated with a reference texture image, as described supra, regarding FIGS. 2, 3, 4, 7, 12, 14, etc. For instance, façade decomposition component 1506 can be configured to merge at least a subset of the set of subdivided regions based at least in part on at least one of bilateral symmetry or repetitive patterns in the reference texture image as described above.

In addition, exemplary non-limiting image-based façade modeling system 1502 can further include a façade augmentation component 1508 that assigns an optimized depth to at least one subdivision region in the set of subdivided regions, for example, as described above, regarding FIGS. 2, 3, 4, 7, 12, 14, etc. Moreover, in further non-limiting embodiments, an image-based façade modeling system 1502 can include a modeling component 1510 that provides, based at least in part on camera location information (e.g., GPS and/or INS data, etc.), an approximate model associated with the reference texture image to the façade modeling system, as described supra, regarding FIGS. 2, 3, 4, 6, 7, 12, 14, etc., for example.

Exemplary image-based façade modeling system 1502 can further include a texture compositing component 1504 that generates a composite image from a sequence of images to provide at least a portion of the reference texture image as described above, regarding FIGS. 2, 3, 4-6, etc. In addition, exemplary image-based façade modeling system 1502 can further include an interface component 1512 that can facilitate, among other things, receiving at least one of subdivision refinement instructions, depth assignment instructions, or guiding instructions for generating the composite image, for example, as described supra, regarding FIGS. 2, 3, 4, 6, 7, 12, 14, etc.

Façade Completion

As further described above, a façade can be textured 220 in methodologies for image-based façade modeling 200 and 300. For example, after augmentation 216 of the façade with appropriate depths, each 2D region of a façade partition can be transformed from a flat rectangle to a box on the dominant plane of the façade. Thus, in various non-limiting embodiments, parameterization on the façade plane can be used to represent the front faces of the augmented subdivision regions. In a further aspect, textures of all front faces can be stored in one map (e.g., textures of all front faces can be stored in a front texture map). Discontinuities between regions due to the difference in depth can create additional side faces. For example, a typical protruding rectangle can have two left and right faces and two up and down faces. According to a further aspect, textures of side faces can be stored in a different texture map (e.g., side texture map). According to various embodiments, textures for both front and side faces can be automatically computed from the original registered images as described above, for example, regarding FIGS. 2-3, and 6.

As described above, each elementary unit of the façade has been approximated as a cubical box that can be sufficient for a majority of the architectural objects on a particular scale of interest. However, it is apparent that some façades can have elements of different geometries and scales. Accordingly, in further aspects of the disclosed subject matter, each element can be re-modeled (e.g., manually re-modeled or otherwise) by using a pre-defined generic cylinder, sphere, and polygonal solid models to replace the given object, as further described above, for example, regarding FIGS. 2-3 and 5.

Figure 20:
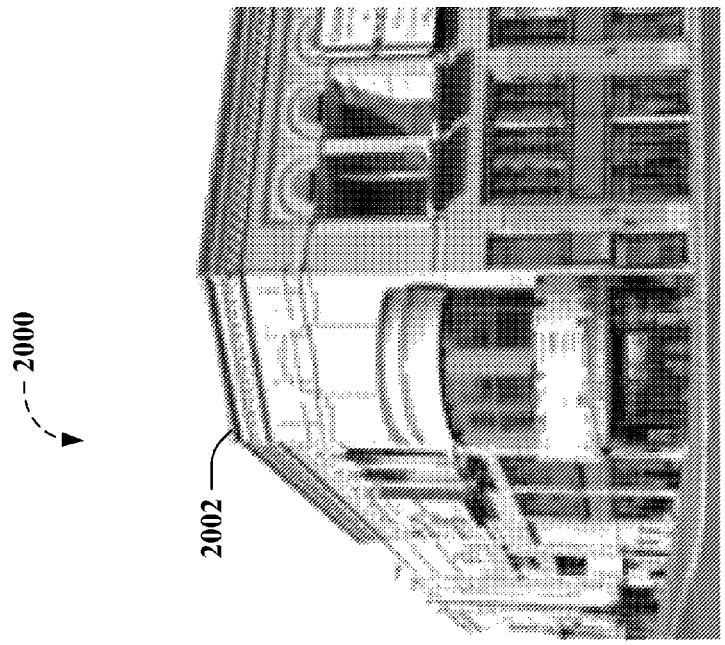
FIGS. 20-21 depict exemplary re-modeling examples for non-rectilinear façades.
Figure 20:
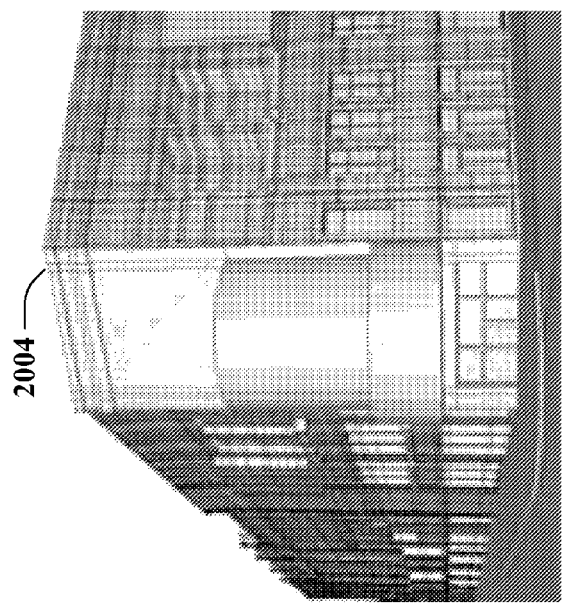
Figure 21:
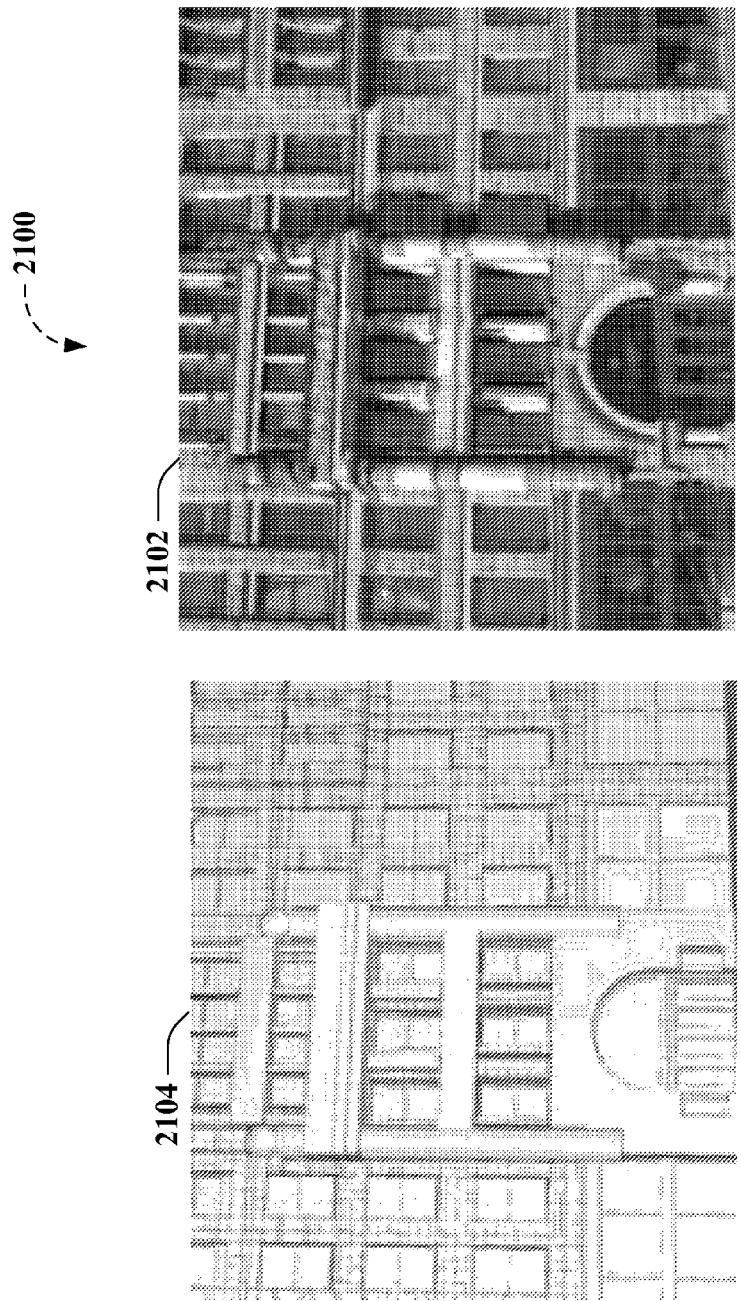

Accordingly, textures can then be re-computed automatically from the original images. Thus, selected structures (e.g., columns, arches, and pediments, etc.) can be conveniently modeled, particularly for a group of elements, with the disclosed decomposition process and automatic texture re-mapping. For example, FIGS. 20-21 depict re-modeling examples according to various aspects of the disclosed subject matter. For instance, FIG. 20 depicts a re-modeling example 2002 using two cylindrical façades as in 2004. As a further example, FIG. 21 depicts a re-modeling example 2102 by replacing a cubical façade with a cylindrical or spherical façade as in 2104. According to various non-limiting embodiments, textures for such re-modeled objects can be automatically computed from the original registered images, as further described above, for example, regarding FIGS. 2-3 and 6.

Exemplary Image-Based Façade Modeling

Figure 22:
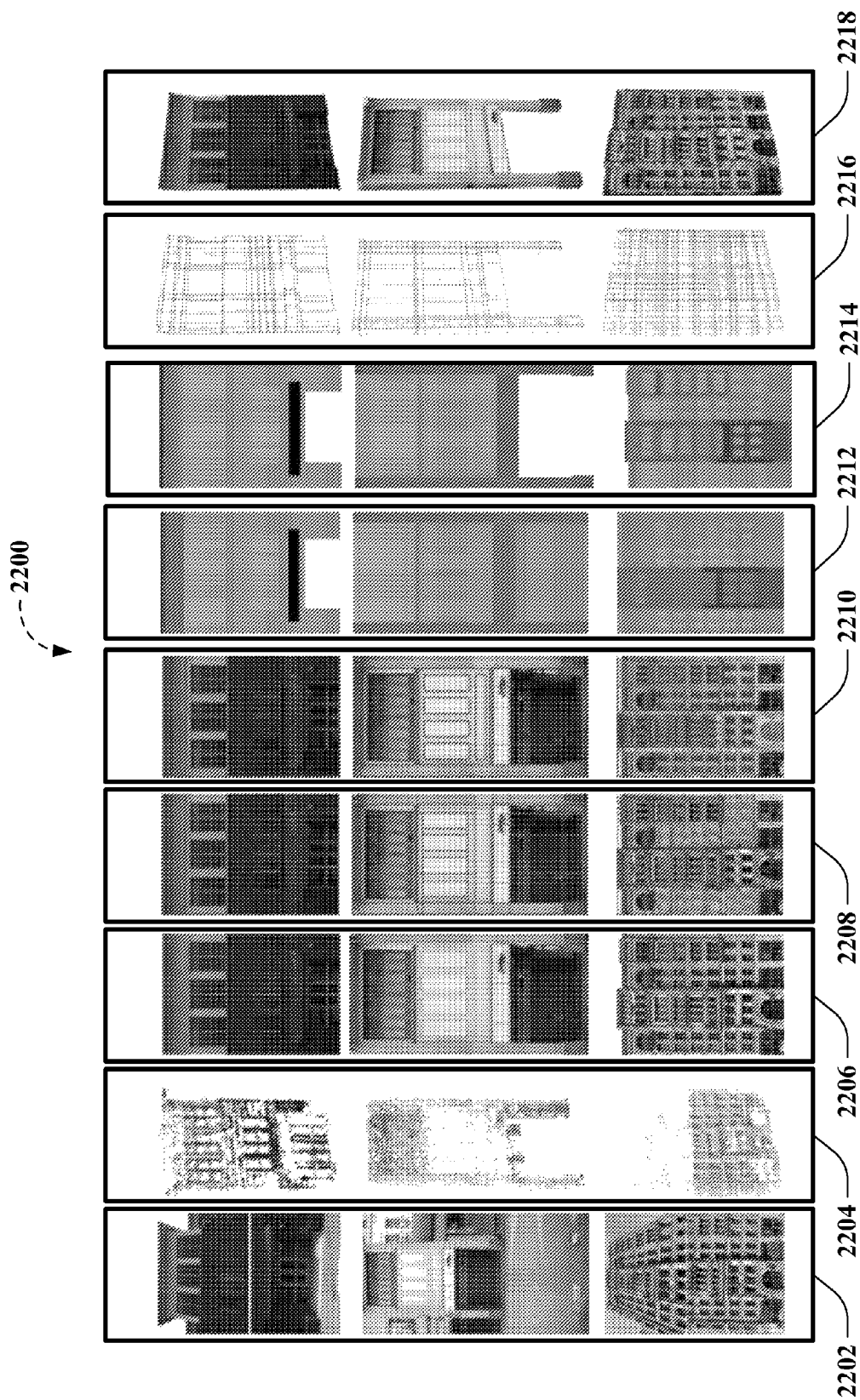
FIG. 22 depicts a series of façade model examples of varying complexity suitable for implementations of the disclosed subject matter.

FIG. 22 depicts a series 2200 of façade model examples of varying complexity suitable for implementations of the disclosed subject matter. For example, FIG. 22 depicts input views 2202, 3D points obtained from SFM 2204, initial textured flat façade 2206, automatic façade partition 2208, refined final partition 2210, re-estimated smoothed façade depth 2212, refined final depth map 2214, façade geometry 2216, and a textured façade model 2218. Three representative large-scale data sets captured under different conditions were chosen to demonstrate the flexibility of the disclosed subject matter. Depending on the complexity of the façade, a video camera on a vehicle (e.g., as in the first exemplary data set), a digital camera on a vehicle (e.g., as for the second exemplary data set), and a handheld camera (e.g., as for the third exemplary data set) can be used.

For example, Baity Hill Drive, Chapel Hill, images were captured by two video cameras of resolution 1024×768 mounted on a vehicle with a GPS/INS (Inertial Navigation System) INS. A sequence of 308 images from each camera were sampled. According to an aspect, resulting clouds of 3D points can be georegistered with the GPS/INS data, as described above. Although, video image quality is mediocre, the richness of the building texture is excellent for SFM, taking about 20 minutes for segmentation on the ground. The geometry of the building blocks is rather simple, and it was reconstructed in about one hour.

In the Dishifu Road, Canton, example depicted in FIG. 1, images were captured by a handheld Canon 5D camera using a 24 mm wide lens with 2912×4368 image resolution. A total of 343 views were captured for one side of the street and 271 views for the opposite side. According to an aspect, the arcade can be modeled using two façades: a front façade for the top part of the arcade and the columns in the front, and a back façade for its lower part. These two façades can be merged together and the invisible ceiling connecting the two parts can be manually added. The interactive segmentation on the ground took about one hour and the reconstruction took about two hours for both sides of the street.

In the Hennepin Avenue, Minneapolis, example, the images were captured by a set of cameras mounted on a vehicle equipped with an GPS/INS system. Each camera has a resolution of 1024×1360. The main portion of the Hennepin avenue was covered by a sequence of 130 views using only one of the side-looking cameras. An additional sequence of seven viewing positions taken by an additional side camera pointed 45 degrees up was used for the processing of the structure of the Masonic temple to capture the top part of the building. To generate a more homogeneous textured layer from multiple images, according to an aspect, images can be white balanced using a diagonal model of illumination change. A Hennepin Avenue model can be completed in about one hour, with the Masonic Temple being the most difficult one to model taking about 10 minutes including re-modeling.

For computation of the structure from motion, long sequences can be broken down into sub-sequences of about 50 images that can be down sampled to the resolution of below 1000×1000. Semi-dense SFM can be automatically computed for each subsequence with auto calibration in about 10 minutes with a PC (e.g., central processing unit (CPU) Intel® Core 2 6400 at 2.13 GigaHertz (GHz) and 3 GigaByte (GB) Random Access Memory (RAM)). The subsequences can be merged into a global sequence using one fifth of the reconstructed points from the sub-sequences and the GPS/INS data if it is available. To capture tall buildings in full, an additional camera can capture views looking upwards in 45 degrees, with little or no overlapping between the viewing fields of the cameras. Cameras can be mounted on a rigid rig that can be pre-calibrated, so that viewing positions could be transferable between the cameras if the computation for one camera is difficult.

For the rendering results in the video, different reflective properties for the windows can be assigned and ground and vegetation can be manually modeled, according to a further aspect. While the various embodiments of the disclosed subject matter are efficient, manual post-editing was primarily conducted in the context of visually important details, e.g., details near the roof tops of the buildings, where the common coverage of the images is small, and the quality of the recovered point cloud is poor. According to a further aspect, re-modeling with generic models for clusters of patches can be performed (e.g., as for Hennepin Avenue examples). It is noted that accuracy of the camera geometry and density of reconstructed points are keys to successful modeling. As a further advantage, GPS/INS data did help to improve the registration of long sequences and avoid the drift associated with the SFM.

Referring again to FIG. 22, typical façade examples from each data set are shown (top two rows), depicting both the before and after editing of the automatic partition. This illustrates that the majority of the façade partitions can be automatically computed with over-segmentation followed by minor user adjustments, according to various embodiments. As a typical non-limiting example, automatic computation time is about one minute per façade, followed by about another minute of manual refinement, depending on the complexity and the desired reconstruction quality.

For a relatively difficult façade example, the Masonic temple façade in the bottom row of FIG. 22 depicts the most difficult case of the exemplary façades, due mainly to the specific capturing conditions. For instance, overlapping of images for the upper part of the building is small and only a few points are reconstruct. The depth map for the upper part is almost constant after optimization and user interaction is more intensive to re-assign the depth for this façade.

As depicted in FIGS. 21-22, re-modeling results are depicted using Hennepin Avenue examples with 12 re-modeling objects 2102, and can be compared with the results obtained without re-modeling 2218. For the topologically complex building façades, according to various aspects multiple façades can be used. Canton arcade street in FIG. 1 is depicted using two façades, one front and one back, where the back façade uses the front façade in front as the occluders.

As can be seen, image-based street-side modeling as described in various embodiments, can use a sequence of overlapping images (e.g., images captured along a street), and can produce complete photo-realistic 3D façade models. While various embodiments have been described, it can be appreciated that various modifications can be made (e.g., automatic depth reconstruction on highly reflective façades, recovering reflectance properties of models from multiple views, improvements in automatic detection of non-rectilinear objects during partition, etc.).

Exemplary Networked and Distributed Environments

One of ordinary skill in the art can appreciate that the various embodiments of image-based modeling described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may utilize image-based façade modeling as described for various embodiments of the subject disclosure.

Figure 23:
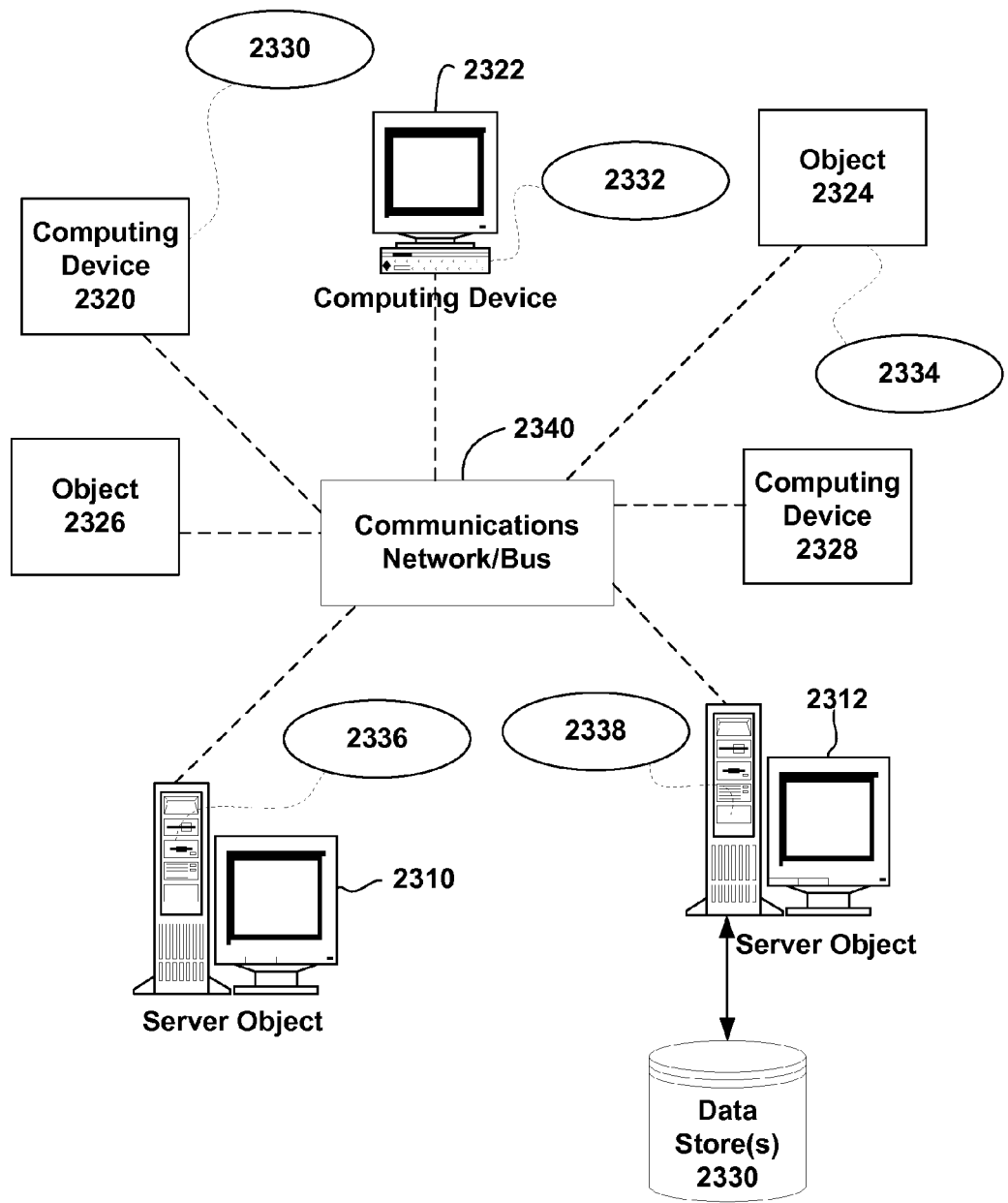
FIG. 23 is a block diagram representing exemplary non-limiting networked environments in which various embodiments described herein can be implemented.

FIG. 23 provides a schematic diagram of an exemplary networked or distributed computing environment. The distributed computing environment comprises computing objects 2310, 2312, etc. and computing objects or devices 2320, 2322, 2324, 2326, 2328, etc., which may include programs, methods, data stores, programmable logic, etc., as represented by applications 2330, 2332, 2334, 2336, 2338. It can be appreciated that objects 2310, 2312, etc. and computing objects or devices 2320, 2322, 2324, 2326, 2328, etc. may comprise different devices, such as PDAs, audio/video devices, mobile phones, MP3 players, personal computers, laptops, etc.

Each object 2310, 2312, etc. and computing objects or devices 2320, 2322, 2324, 2326, 2328, etc. can communicate with one or more other objects 2310, 2312, etc. and computing objects or devices 2320, 2322, 2324, 2326, 2328, etc. by way of the communications network 2340, either directly or indirectly. Even though illustrated as a single element in FIG. 23, network 2340 may comprise other computing objects and computing devices that provide services to the system of FIG. 23, and/or may represent multiple interconnected networks, which are not shown. Each object 2310, 2312, etc. or 2320, 2322, 2324, 2326, 2328, etc. can also contain an application, such as applications 2330, 2332, 2334, 2336, 2338, that might make use of an API, or other object, software, firmware and/or hardware, suitable for communication with or implementation of the image-based façade modeling provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to image-based façade modeling as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 23, as a non-limiting example, computers 2320, 2322, 2324, 2326, 2328, etc. can be thought of as clients and computers 2310, 2312, etc. can be thought of as servers where servers 2310, 2312, etc. provide data services, such as receiving data from client computers 2320, 2322, 2324, 2326, 2328, etc., storing of data, processing of data, transmitting data to client computers 2320, 2322, 2324, 2326, 2328, etc., although any computer can be considered a client, a server, or both, depending on the circumstances. Any of these computing devices may be processing data, forming metadata, synchronizing data or requesting services or tasks that may implicate the image-based façade modeling as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing image-based façade modeling can be provided standalone, or distributed across multiple computing devices or objects.

In a network environment in which the communications network/bus 2340 is the Internet, for example, the servers 2310, 2312, etc. can be Web servers with which the clients 2320, 2322, 2324, 2326, 2328, etc. communicate via any of a number of known protocols, such as the hypertext transfer protocol (HTTP). Servers 2310, 2312, etc. may also serve as clients 2320, 2322, 2324, 2326, 2328, etc., as may be characteristic of a distributed computing environment.

Exemplary Computing Device

Figure 24:
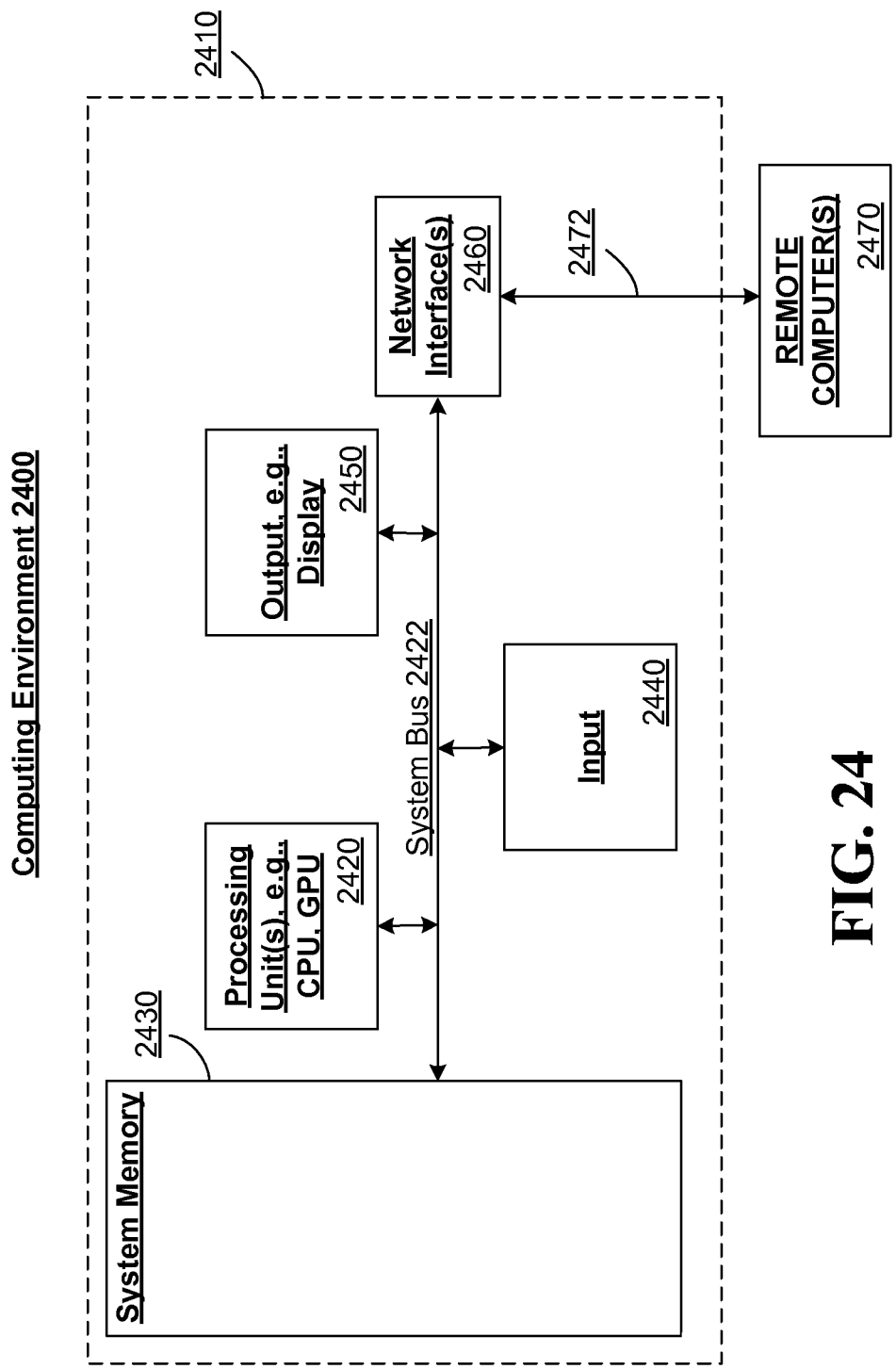
FIG. 24 is a block diagram representing an exemplary non-limiting computing system or operating environment in which one or more aspects of various embodiments described herein can be implemented.

As mentioned, advantageously, the techniques described herein can be applied to any device where it is desirable to perform image-based façade modeling. It should be understood, therefore, that handheld, portable and other computing devices and computing objects of all kinds are contemplated for use in connection with the various embodiments, i.e., anywhere that a device may wish to synchronize data. Accordingly, the below general purpose remote computer described below in FIG. 24 is but one example of a computing device. Additionally, image-based façade modeling can include one or more aspects of the below general purpose computer, such as display or output of the façades being modeled via the display 2450.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 24 thus illustrates an example of a suitable computing system environment 2400 in which one or aspects of the embodiments described herein can be implemented, although as made clear above, the computing system environment 2400 is only one example of a suitable computing environment and is not intended to suggest any limitation as to scope of use or functionality. Neither should the computing environment 2400 be interpreted as having any dependency or requirement relating to any one or combination of components illustrated in the exemplary operating environment 2400.

With reference to FIG. 24, an exemplary remote device for implementing one or more embodiments includes a general purpose computing device in the form of a computer 2410. Components of computer 2410 may include, but are not limited to, a processing unit 2420, a system memory 2430, and a system bus 2422 that couples various system components including the system memory to the processing unit 2420.

Computer 2410 typically includes a variety of computer readable media and can be any available media that can be accessed by computer 2410. The system memory 2430 may include computer storage media in the form of volatile and/or nonvolatile memory such as read only memory (ROM) and/or random access memory (RAM). By way of example, and not limitation, memory 2430 may also include an operating system, application programs, other program modules, and program data.

A user can enter commands and information into the computer 2410 through input devices 2440. A monitor or other type of display device is also connected to the system bus 2422 via an interface, such as output interface 2450. In addition to a monitor, computers can also include other peripheral output devices such as speakers and a printer, which may be connected through output interface 2450.

The computer 2410 may operate in a networked or distributed environment using logical connections to one or more other remote computers, such as remote computer 2470. The remote computer 2470 may be a personal computer, a server, a router, a network PC, a peer device or other common network node, or any other remote media consumption or transmission device, and may include any or all of the elements described above relative to the computer 2410. The logical connections depicted in FIG. 24 include a network 2472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to perform image-based façade modeling.

Also, there are multiple ways to implement the same or similar functionality, e.g., an appropriate API, tool kit, driver code, operating system, control, standalone or downloadable software object, etc. which enables applications and services to use the image-based façade modeling. Thus, embodiments herein are contemplated from the standpoint of an API (or other software object), as well as from a software or hardware object that implements one or more aspects of the image-based façade modeling described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method that facilitates image-based façade modeling, comprising:

determining, by a system comprising a processor, a composite texture image associated with a sequence of captured images, including obtaining camera positions associated with the sequence of captured images and obtaining three dimensional (3D) points associated with the sequence of captured images used to determine the composite texture image;

decomposing, by the system, a data representation of a façade that is based at least in part on the composite texture image, the camera positions, and the 3D points, by recursively subdividing the data representation of the façade into a set of subdivided patches;

bottom-up merging of at least a subset of the set of subdivided patches by merging neighboring subdivided patches based at least in part on a determination that a measure of support to separate neighboring subdivided patches based on architectural bilateral symmetry is not enough;

structuring, after the bottom-up merging, the data representation of the façade into a directed acyclic graph of rectilinear patches; and augmenting the data representation of the façade with depth information based on the sequence of captured images and a subset of the 3D points by determining, by the system, and assigning an optimized depth to at least one of the subdivided patches.

2. The method of claim 1, wherein the subdividing includes subdividing the data representation of the façade into the set of subdivided patches based at least in part on recovering lines of hidden structure in the data representation of the façade.

3. The method of claim 1, wherein the determining the composite texture image comprises employing a photo consistency constraint based on patch similarity to detect at least one occluding object in the sequence of captured images.

4. The method of claim 1, wherein the obtaining the camera positions and the obtaining the 3D points comprises computing the camera positions and the 3D points as a set of dense 3D points from the sequence of captured images.

5. The method of claim 1, wherein the determining the optimized depth comprises determining the optimized depth based on the 3D points associated with the sequence of captured images used to determine the composite texture image, and wherein the assigning includes receiving a depth assignment instruction related to a subset of the subdivided patches.

6. The method of claim 1, wherein the assigning includes determining a maximum a posteriori (MAP) estimation of a Markov Random Field (MRF) graph and minimizing an image and viewpoint independent constraint for the façade based on the sequence of captured images and the 3D points.

7. A method, comprising:
    extracting, by a system comprising a processor, hidden structure from a reference texture image by recovering segmented lines of hidden structure through application of a Hough transform;
    weighting, by the system, the segmented lines of hidden structure according to the correspondence of the segmented lines of hidden structure with an edge map for the reference texture image to partition the reference texture image;
    recursively subdividing the reference texture image by the system into a set of subdivided regions based at least in part on the partitioned reference texture image;
    bottom-up merging, by the system, at least a subset of the set of subdivided regions by merging neighboring subdivided regions based at least in part on a determination that a measure of support to separate neighboring subdivided regions based on architectural bilateral symmetry is not enough;
    structuring, by the system, the partitioned reference texture image into a directed acyclic graph of rectilinear regions associated with the reference texture image; and
    augmenting a data representation of a façade with depth information based on the reference texture image and a subset of three dimensional (3D) points associated with the reference texture image by determining and assigning an optimized depth to at least one of the set of subdivided regions.

8. The method of claim 7, wherein the subdividing includes subdividing the reference texture image into the set of subdivided regions based at least in part receiving partition refinement instructions.

9. The method of claim 7, further comprising: performing an edge detection on the reference texture image to create the edge map.

10. A method of façade augmentation in a façade modeling system, comprising:
    receiving, by a system comprising a processor, data associated with a sequence of captured images, including associated three dimensional (3D) points related to the sequence of captured images, representing a façade structured into a directed acyclic graph and having a set of subdivided regions of a texture image based on the sequence of captured images;
    determining, by the system, and assigning an optimized depth based on the sequence of captured images and the associated 3D points to at least one subdivision region in the set of subdivided regions based at least in part on a determined maximum a posteriori (MAP) estimation of a Markov Random Field (MRF) graph and a minimized image and viewpoint independent constraint associated with the texture image, wherein the MRF graph is defined based on the at least one subdivision region represented by a single site.

11. The method of claim 10, wherein the assigning includes receiving a depth assignment instruction related to the at least one subdivision region.

12. The method of claim 11, wherein the assigning includes assigning the optimized depth based at least in part on the depth assignment instruction related to the at least one subdivision region.

13. An image-based façade modeling system comprising:
    a memory to store computer-executable components; and
    a processor communicatively coupled to the memory that facilitates execution of the computer-executable components, the computer-executable components comprising:
    a texture compositing component that determines a composite texture image associated with a sequence of captured images, obtains camera positions associated with the sequence of captured images, and obtains three dimensional (3D) points associated with the sequence of captured images used to determine the composite texture image;
    a façade decomposition component that decomposes a data representation of a façade that is based at least in part on the composite texture image, the camera positions, and the 3D points by recursively subdividing the data representation of the façade into a set of subdivided regions, bottom-up merges at least a subset of the set of subdivided regions by merging neighboring subdivided regions based at least in part on a determination that a measure of support to separate neighboring subdivided regions based on architectural bilateral symmetry is not enough, and structures, after the bottom-up merging, the data representation of the façade into a directed acyclic graph of rectilinear patches; and
    a façade augmentation component that assigns an optimized depth based on the sequence of captured images and associated 3D points related to the sequence of captured images to at least one subdivision regions in the set of subdivided regions.

14. The system of claim 13, wherein the computer-executable components further comprise:
    a modeling component that provides, based at least in part on camera location information, an approximate model associated with the composite texture image to the façade modeling system.

15. The system of claim 13, wherein the computer-executable components further comprise:
    an interface component that facilitates receiving at least one of subdivision refinement instructions, depth assignment instructions, or guiding instructions for generating the composite texture image.

* * * * *